United States Patent
Kim et al.

(10) Patent No.: US 11,258,184 B2
(45) Date of Patent: Feb. 22, 2022

(54) ANTENNA SYSTEM INCLUDING A POLYMER COMPOSITION HAVING A LOW DISSIPATION FACTOR

(71) Applicant: Ticona LLC, Florence, KY (US)

(72) Inventors: Young Shin Kim, Cincinnati, OH (US); Xinyu Zhao, Cincinnati, OH (US)

(73) Assignee: Ticona LLC, Florence, KY (US)

(*) Notice: Subject to any disclaimer, the term of this patent is extended or adjusted under 35 U.S.C. 154(b) by 9 days.

(21) Appl. No.: 16/995,870

(22) Filed: Aug. 18, 2020

(65) Prior Publication Data

US 2021/0057827 A1  Feb. 25, 2021

Related U.S. Application Data

(60) Provisional application No. 63/056,842, filed on Jul. 27, 2020, provisional application No. 63/038,959, filed on Jun. 15, 2020, provisional application No. 63/024,557, filed on May 14, 2020, provisional application No. 63/008,979, filed on Apr. 13, 2020, provisional application No. 62/994,314, filed on Mar. 25, 2020, provisional application No. 62/972,195, filed on Feb. 10, 2020, provisional application No. 62/951,039, filed on Dec. 20, 2019, provisional
(Continued)

(51) Int. Cl.
*H01Q 1/38* (2006.01)
*H01Q 21/00* (2006.01)
*H01Q 21/06* (2006.01)

(52) U.S. Cl.
CPC .......... *H01Q 21/0087* (2013.01); *H01Q 1/38* (2013.01); *H01Q 21/0012* (2013.01); *H01Q 21/065* (2013.01)

(58) Field of Classification Search
CPC .............................. H01Q 21/0087; H01Q 1/38

USPC ........................................................ 343/702
See application file for complete search history.

(56) References Cited

U.S. PATENT DOCUMENTS

| 4,162,466 A | 7/1979 | Hunsinger et al. |
| 4,458,039 A | 7/1984 | Eickman |

(Continued)

FOREIGN PATENT DOCUMENTS

| CN | 104961916 A | 10/2015 |
| CN | 104961922 A | 10/2015 |

(Continued)

OTHER PUBLICATIONS

Young Shin Kim, U.S. Appl. No. 17/178,318, filed Feb. 18, 2021, Polymer Composition for Use in an Antenna System.
(Continued)

*Primary Examiner* — Peguy Jean Pierre

(74) *Attorney, Agent, or Firm* — Dority & Manning, P.A.

(57) ABSTRACT

A 5G antenna system is disclosed that comprises a substrate and at least one antenna element configured to transmit and receive 5G radio frequency signals. The at least one antenna element is coupled to the substrate. The substrate comprises a polymer composition that comprises a polymer matrix containing at least one polymer having a glass transition temperature of about 30° C. or more and at least one laser activatable additive wherein the polymer composition exhibits a dissipation factor of about 0.1 or less, as determined at a frequency of 2 GHz.

36 Claims, 7 Drawing Sheets

Related U.S. Application Data application No. 62/925,274, filed on Oct. 24, 2019, provisional application No. 62/898,188, filed on Sep. 10, 2019, provisional application No. 62/889,792, filed on Aug. 21, 2019.

(56) References Cited

U.S. PATENT DOCUMENTS

| | | |
|---|---|---|
| 4,746,694 A | 5/1988 | Charbonneau et al. |
| 4,960,654 A | 10/1990 | Yoshinaka et al. |
| 5,032,627 A | 7/1991 | Wilson et al. |
| 5,348,990 A | 9/1994 | Walpita et al. |
| 5,541,240 A | 7/1996 | Makhija et al. |
| 5,624,984 A | 4/1997 | Furuta et al. |
| 5,767,195 A | 6/1998 | Furuta et al. |
| 6,121,369 A | 9/2000 | Stack et al. |
| 6,303,524 B1 | 10/2001 | Sharangpani et al. |
| 6,346,864 B1 | 2/2002 | Kadota |
| 6,350,822 B1 | 2/2002 | Van Diepen et al. |
| 6,495,616 B2 | 12/2002 | Maeda |
| 6,641,928 B2 | 11/2003 | Takeichi et al. |
| 6,756,427 B2 | 6/2004 | Maeda |
| 6,818,821 B2 | 11/2004 | Fujieda et al. |
| 7,079,405 B2 | 7/2006 | Tobita et al. |
| 7,180,172 B2 | 2/2007 | Sethumadhaven et al. |
| 7,223,807 B2 | 5/2007 | Okamoto et al. |
| 7,239,261 B2 | 7/2007 | Fujieda et al. |
| 7,247,590 B2 | 7/2007 | Kawabata et al. |
| 7,314,898 B2 | 1/2008 | Downing, Jr. et al. |
| 7,455,901 B2 | 11/2008 | Yano et al. |
| 7,504,150 B2 | 3/2009 | Lee et al. |
| 7,531,204 B2 | 5/2009 | Lee et al. |
| 7,547,849 B2 | 6/2009 | Lee et al. |
| 7,583,226 B2 | 9/2009 | Sakurada |
| 7,618,553 B2 | 11/2009 | Kim et al. |
| 7,648,758 B2 | 1/2010 | Morin |
| 7,704,408 B2 | 5/2010 | Fuksatu |
| 7,713,439 B2 | 5/2010 | Murouchi et al. |
| 7,737,198 B2 | 6/2010 | Murouchi et al. |
| 7,790,786 B2 | 9/2010 | Murouchi et al. |
| 7,897,083 B2 | 3/2011 | Fukatsu et al. |
| 7,985,351 B2 | 7/2011 | Yamauchi et al. |
| 8,012,352 B1 | 9/2011 | Giraldo et al. |
| 8,025,814 B2 | 9/2011 | Uehara et al. |
| 8,043,527 B2 | 10/2011 | Iwase et al. |
| 8,066,907 B2 | 11/2011 | Kohinata et al. |
| 8,192,645 B2 | 6/2012 | Murouchi et al. |
| 8,222,802 B2 | 7/2012 | Saito et al. |
| 8,226,851 B2 | 7/2012 | Harada et al. |
| 8,231,807 B2 | 7/2012 | Yonezawa et al. |
| 8,309,640 B2 | 11/2012 | Li et al. |
| 8,337,719 B2 | 12/2012 | Hosoda et al. |
| 8,425,798 B2 | 4/2013 | Saito et al. |
| 8,475,924 B2 | 7/2013 | Lee et al. |
| 8,492,464 B2 | 7/2013 | Li et al. |
| 8,545,718 B2 | 10/2013 | Nakayama et al. |
| 8,580,145 B2 | 11/2013 | Osato et al. |
| 8,641,924 B2 | 2/2014 | Sekimura et al. |
| 8,642,682 B2 | 2/2014 | Nishihata |
| 8,692,272 B2 | 4/2014 | Matsumi et al. |
| 8,715,526 B2 | 5/2014 | Kitai et al. |
| 8,816,019 B2 | 8/2014 | Ganguly et al. |
| 8,841,367 B2 | 9/2014 | Zheng et al. |
| 8,883,900 B2 | 11/2014 | Jiang et al. |
| 8,894,880 B2 | 11/2014 | Shin et al. |
| 8,895,649 B2 | 11/2014 | Li et al. |
| 8,926,862 B2 | 1/2015 | Kim et al. |
| 8,927,661 B2 | 1/2015 | Li et al. |
| 8,946,333 B2 | 2/2015 | Raman et al. |
| 8,992,805 B2 | 3/2015 | Nishimura et al. |
| 9,018,286 B2 | 4/2015 | Daga et al. |
| 9,023,923 B2 | 5/2015 | An et al. |
| 9,074,070 B2 | 7/2015 | Yung et al. |
| 9,185,800 B2 | 11/2015 | Meng et al. |
| 9,234,092 B2 | 1/2016 | Nakayama et al. |
| 9,258,892 B2 | 2/2016 | Crosley |
| 9,283,707 B2 | 3/2016 | Saito et al. |
| 9,355,753 B2 | 5/2016 | Kim |
| 9,394,483 B2 | 7/2016 | Wu et al. |
| 9,538,646 B2 | 1/2017 | Onodera et al. |
| 9,574,065 B2 | 2/2017 | Miyamoto et al. |
| 9,896,566 B2 | 2/2018 | Yung et al. |
| 9,944,768 B2 | 4/2018 | Cheng et al. |
| 9,982,113 B2 | 5/2018 | Kniess et al. |
| 10,106,682 B2 | 10/2018 | Kim |
| 10,119,021 B2 | 11/2018 | Li et al. |
| 10,150,863 B2 | 12/2018 | Wu et al. |
| 10,174,180 B2 | 1/2019 | Bao et al. |
| 10,233,301 B2 | 3/2019 | Kato et al. |
| 10,273,362 B2 | 4/2019 | Zhang et al. |
| 10,290,389 B2 | 5/2019 | Wu et al. |
| 10,329,422 B2 | 6/2019 | Li et al. |
| 10,604,649 B2 | 3/2020 | Yamanaka |
| 10,697,065 B2 | 6/2020 | Hua et al. |
| 10,714,810 B2 | 7/2020 | Hong et al. |
| 10,741,932 B2 | 8/2020 | Thai et al. |
| 10,767,049 B2 | 9/2020 | Kim |
| 10,784,030 B2 | 9/2020 | Lee et al. |
| 10,822,452 B2 | 11/2020 | Tsuchiya et al. |
| 10,822,453 B2 | 11/2020 | Washino |
| 10,899,900 B2 | 1/2021 | Jung et al. |
| 10,968,311 B2 | 4/2021 | Washino |
| 10,968,347 B2 | 4/2021 | Akiyama et al. |
| 11,028,250 B2 | 6/2021 | Zhang et al. |
| 11,075,442 B2 | 7/2021 | Wang et al. |
| 2004/0165390 A1 | 8/2004 | Sato et al. |
| 2005/0130447 A1 | 6/2005 | Takaya et al. |
| 2007/0057236 A1 | 3/2007 | Hosoda et al. |
| 2010/0012354 A1 | 1/2010 | Hedin et al. |
| 2010/0051999 A1 | 3/2010 | Iwase et al. |
| 2010/0053972 A1 | 3/2010 | Nakayama |
| 2010/0263919 A1 | 10/2010 | Lee et al. |
| 2010/0327728 A1 | 12/2010 | Saito et al. |
| 2012/0040128 A1 | 2/2012 | Finn |
| 2012/0276390 A1 | 11/2012 | Ji et al. |
| 2014/0060899 A1 | 3/2014 | Park et al. |
| 2014/0128545 A1 | 5/2014 | Xiong et al. |
| 2014/0142571 A1 | 5/2014 | Yung et al. |
| 2014/0159285 A1 | 6/2014 | Choi |
| 2014/0171567 A1 | 6/2014 | Guo et al. |
| 2014/0296411 A1 | 10/2014 | Cheng et al. |
| 2014/0353543 A1 | 12/2014 | Wu et al. |
| 2015/0337132 A1 | 11/2015 | Van der Burgt |
| 2016/0116948 A1 | 4/2016 | Ou et al. |
| 2016/0301141 A1 | 10/2016 | Del Castillo et al. |
| 2017/0002193 A1 | 1/2017 | Cheng et al. |
| 2017/0273179 A1 | 9/2017 | Kim |
| 2017/0361584 A1 | 12/2017 | Feng et al. |
| 2017/0362731 A1 | 12/2017 | Wang et al. |
| 2017/0367182 A1 | 12/2017 | Wu et al. |
| 2018/0215894 A1 | 8/2018 | Cheng et al. |
| 2018/0230294 A1 | 8/2018 | Cheng et al. |
| 2018/0332710 A1 | 11/2018 | Lin et al. |
| 2018/0346711 A1 | 12/2018 | Van der Burgt et al. |
| 2018/0355150 A1 | 12/2018 | Kim |
| 2018/0362758 A1 | 12/2018 | Wu et al. |
| 2019/0027813 A1 | 1/2019 | Wang |
| 2019/0031879 A1 | 1/2019 | Ding et al. |
| 2019/0153216 A1 | 5/2019 | Gong et al. |
| 2019/0237851 A1 | 8/2019 | Gu |
| 2019/0269012 A1 | 8/2019 | Van der Burgt |
| 2019/0322861 A1 | 10/2019 | Wei et al. |
| 2019/0341696 A1 | 11/2019 | O'Connor et al. |
| 2019/0352501 A1 | 11/2019 | Wang et al. |
| 2019/0352503 A1 | 11/2019 | Cheng et al. |
| 2020/0017769 A1 | 1/2020 | Konno et al. |
| 2020/0022264 A1 | 1/2020 | Cheng et al. |
| 2020/0040133 A1 | 2/2020 | Washino |
| 2020/0076035 A1 | 3/2020 | Huh et al. |
| 2020/0091608 A1 | 3/2020 | Alpman et al. |
| 2020/0219830 A1* | 7/2020 | Nair .................. H01L 23/5386 |
| 2020/0219861 A1 | 7/2020 | Kamgaing et al. |
| 2020/0299582 A1 | 9/2020 | Komatsu |
| 2020/0308487 A1 | 10/2020 | Hegi |

(56) References Cited

U.S. PATENT DOCUMENTS

| | | |
|---|---|---|
| 2020/0347224 A1 | 11/2020 | Hara |
| 2020/0369884 A1 | 11/2020 | Lee et al. |
| 2020/0399465 A1 | 12/2020 | Hara |
| 2021/0024701 A1 | 1/2021 | Wang et al. |
| 2021/0054190 A1 | 2/2021 | Kim |
| 2021/0057811 A1 | 2/2021 | Kim |
| 2021/0070927 A1 | 3/2021 | Zhang et al. |
| 2021/0070929 A1 | 3/2021 | Kim et al. |
| 2021/0070983 A1 | 3/2021 | Kim et al. |
| 2021/0075093 A1 | 3/2021 | Zhang et al. |
| 2021/0075162 A1 | 3/2021 | Kim et al. |
| 2021/0091818 A1 | 3/2021 | Zhang et al. |
| 2021/0092836 A1 | 3/2021 | Zhang et al. |
| 2021/0130585 A1 | 5/2021 | Wang et al. |
| 2021/0130604 A1 | 5/2021 | Ramakrishnan et al. |
| 2021/0143539 A1 | 5/2021 | Yuan et al. |
| 2021/0269588 A1 | 9/2021 | Washino |
| 2021/0274652 A1 | 9/2021 | Kim |

FOREIGN PATENT DOCUMENTS

| | | |
|---|---|---|
| CN | 105542408 A | 5/2016 |
| CN | 106633680 A | 5/2017 |
| CN | 107022171 A | 8/2017 |
| CN | 105623206 B | 12/2017 |
| CN | 108045022 A | 5/2018 |
| CN | 108102314 A | 6/2018 |
| CN | 108178906 A | 6/2018 |
| CN | 108250692 A | 7/2018 |
| CN | 207772540 U | 8/2018 |
| CN | 108148433 A | 12/2018 |
| CN | 109301507 A | 2/2019 |
| CN | 109467643 A | 3/2019 |
| CN | 109467722 A | 3/2019 |
| CN | 109509975 A | 3/2019 |
| CN | 208675597 U | 3/2019 |
| CN | 106633860 B | 4/2019 |
| CN | 109735060 A | 5/2019 |
| CN | 109742534 A | 5/2019 |
| CN | 109755729 A | 5/2019 |
| CN | 109755733 A | 5/2019 |
| CN | 109790361 A | 5/2019 |
| CN | 208904227 U | 5/2019 |
| CN | 110154464 A | 8/2019 |
| CN | 209266563 U | 8/2019 |
| CN | 209266570 U | 8/2019 |
| CN | 209266571 U | 8/2019 |
| CN | 209516005 U | 10/2019 |
| CN | 209544599 U | 10/2019 |
| CN | 110505753 A | 11/2019 |
| CN | 110746754 A | 2/2020 |
| CN | 110769594 A | 2/2020 |
| CN | 110903612 A | 3/2020 |
| CN | 111087765 A | 5/2020 |
| CN | 111087797 A | 5/2020 |
| CN | 111117169 A | 5/2020 |
| CN | 111286176 A | 6/2020 |
| CN | 111320848 A | 6/2020 |
| CN | 210706390 U | 6/2020 |
| CN | 111393806 A | 7/2020 |
| EP | 2 774 952 B1 | 9/2014 |
| EP | 2 981 573 B1 | 6/2018 |
| EP | 3 674 080 A1 | 7/2020 |
| EP | 3 674 368 A1 | 7/2020 |
| EP | 3 730 545 A1 | 10/2020 |
| JP | 2003268089 A | 9/2003 |
| JP | 2003268241 A | 9/2003 |
| JP | 2004143270 A | 5/2004 |
| JP | 2004277539 A | 10/2004 |
| JP | 2004323705 A | 11/2004 |
| JP | 2005078806 A | 3/2005 |
| JP | 4945097 B2 | 1/2007 |
| JP | 2007154169 A | 6/2007 |
| JP | 2007273537 A | 10/2007 |
| JP | 2009114418 A | 5/2009 |
| JP | 4339966 B2 | 10/2009 |
| JP | 2010254875 A | 11/2010 |
| JP | 2011052037 A | 3/2011 |
| JP | 2011093973 A | 5/2011 |
| JP | 2013108008 A | 6/2013 |
| JP | 5280281 B2 | 9/2013 |
| JP | 5332081 B2 | 11/2013 |
| JP | 2015059178 A | 3/2015 |
| JP | 5866423 B2 | 2/2016 |
| JP | 2016041828 A | 3/2016 |
| JP | 5919613 B2 | 5/2016 |
| JP | 5924527 B2 | 5/2016 |
| JP | 2017095625 A | 6/2017 |
| JP | 2017119378 A | 7/2017 |
| JP | 2017120826 A | 7/2017 |
| JP | 6177191 B2 | 8/2017 |
| JP | 6181587 B2 | 8/2017 |
| JP | 2017179127 A | 10/2017 |
| JP | 2018016753 A | 2/2018 |
| JP | 2018016754 A | 2/2018 |
| JP | 6295013 B2 | 3/2018 |
| JP | 2018030948 A | 3/2018 |
| JP | 6359225 B2 | 7/2018 |
| JP | 2018109090 A | 7/2018 |
| JP | 6405817 B2 | 10/2018 |
| JP | 6405818 B2 | 10/2018 |
| JP | 2018168320 A | 11/2018 |
| JP | 2019006973 A | 1/2019 |
| JP | 6470295 B2 | 2/2019 |
| JP | 2019065263 A | 4/2019 |
| JP | 2019094489 A | 6/2019 |
| JP | 2019094497 A | 6/2019 |
| JP | 2019099618 A | 6/2019 |
| JP | 2019106434 A | 6/2019 |
| JP | 2019116586 A | 7/2019 |
| JP | 2019127556 A | 8/2019 |
| JP | 2019127557 A | 8/2019 |
| JP | 6576754 B2 | 9/2019 |
| JP | 6576808 B2 | 9/2019 |
| JP | 2019189734 A | 10/2019 |
| JP | 2019189735 A | 10/2019 |
| JP | 2019189736 A | 10/2019 |
| JP | 2019189737 A | 10/2019 |
| JP | 6773824 B2 | 10/2020 |
| KR | 102104752 B1 | 4/2020 |
| KR | 102104753 B1 | 4/2020 |
| KR | 20200070501 A | 6/2020 |
| KR | 102167337 B1 | 10/2020 |
| WO | WO 2014/162254 A1 | 10/2014 |
| WO | WO 2014/180550 A1 | 11/2014 |
| WO | WO 2014/203227 A2 | 12/2014 |
| WO | WO 2017/029608 A1 | 2/2017 |
| WO | WO 2018/026601 A1 | 2/2018 |
| WO | WO 2018/038093 A1 | 3/2018 |
| WO | WO 2018/056294 A1 | 3/2018 |
| WO | WO 2018/141769 A1 | 8/2018 |
| WO | WO 2019/042906 A1 | 3/2019 |
| WO | WO 2019/213920 A1 | 11/2019 |
| WO | WO 2020/095997 A1 | 5/2020 |
| WO | WO 2020/194196 A1 | 10/2020 |
| WO | WO 2020/217225 A1 | 10/2020 |

OTHER PUBLICATIONS

Amato, Ing. Francesco, Ph.D., "A Primer on 5G," Jan. 11, 2019, 19 pages.
Bjornson, Emil, "Massive MIMO for 5G," Tutorial at 2015 IEEE International Workshop on Signal Processing Advances in Wireless Communications, (SPAWC), Jun. 29, Stockholm, Sweden 58 pages.
Hassan et al., Massive MIMO Wireless Networks: An Overview, *Electronics*, 2017, 6, 63, pp. 1-29.
Jilani et al., "Millimeter-wave Liquid Crystal Polymer Based Antenna Array for Conformal 5G Applications," *IEEE Antennas and Wireless Propagation Letters*, vol. 18, Issue 1, Jan. 2019, pp. 84-88.
Paper—The Fifth Generation of Wireless Network Communications from TE Connectivity, Apr. 2019, 20 pages.
Paper—Material Solutions for 5G Applications from SABIC, 2018, 4 pages.

(56) References Cited

OTHER PUBLICATIONS

Takata, et al., "Electrical properties and practical applications of Liquid Crystal Polymer flex," *IEEE Polytronic 2007 Conference*, pp. 67-72.
Technical Article—Plastic Materials—Liquid Crystal Polymers from Steinwall Plastic Injection Molding, May 2016, 3 pages.
Theil et al., "The Effect of Thermal Cycling on a-C:F,H Low Dielectric Constant Films Deposited by ECR Plasma Enhanced Chemical Vapor Deposition," *Proceedings for the International Interconnect Technology Conference*, Jun. 1998, p. 128-131, 3 pages.
International Search Report and Written Opinion for PCT/US2020/046927 dated Jan. 19, 2021, 8 pages.
Related Application Form.

\* cited by examiner

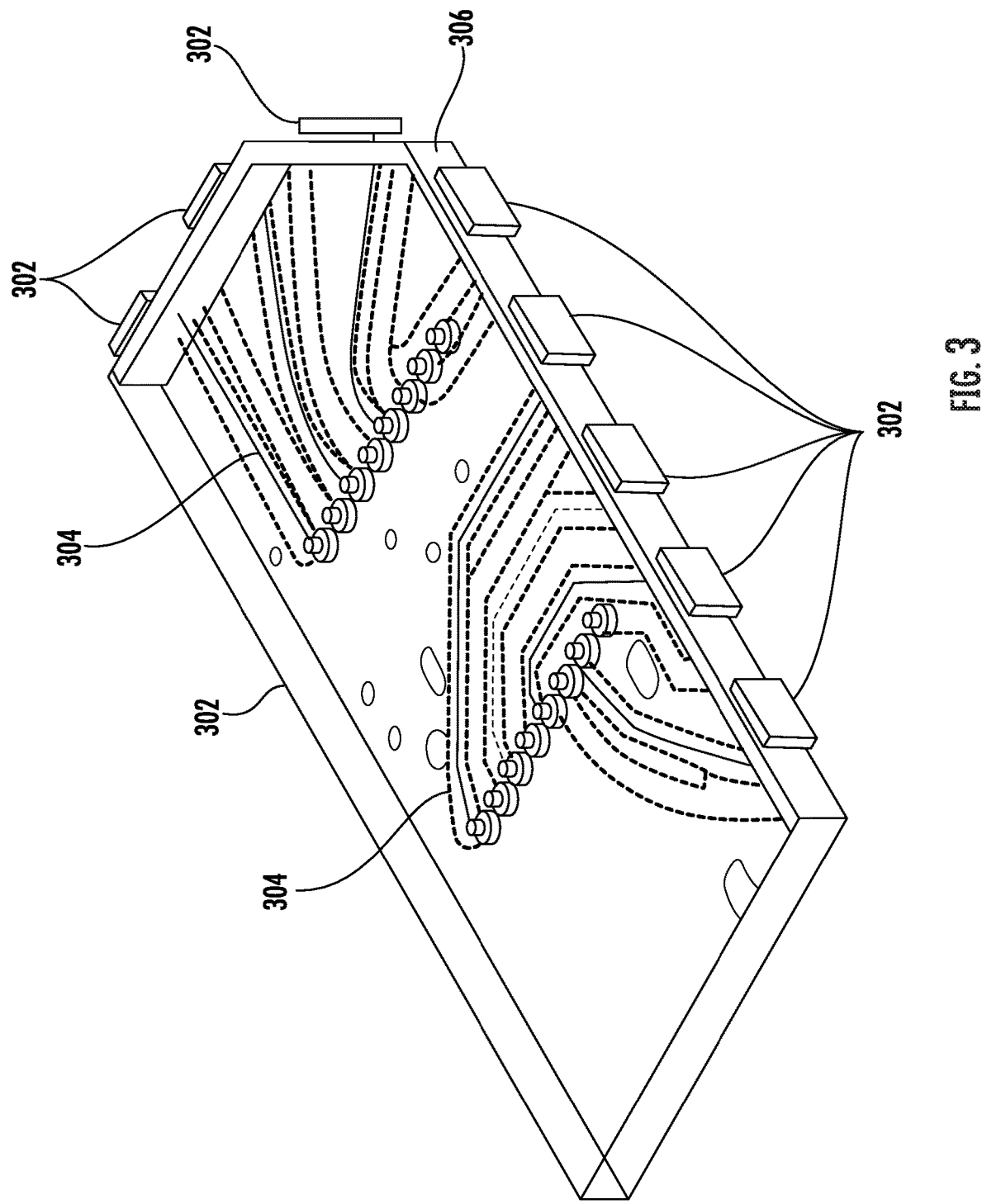

ANTENNA SYSTEM INCLUDING A POLYMER COMPOSITION HAVING A LOW DISSIPATION FACTOR

CROSS REFERENCE TO RELATED APPLICATIONS

The present application claims filing benefit of U.S. Provisional Patent Application Ser. No. 62/889,792 having a filing date of Aug. 21, 2019; U.S. Provisional Patent Application Ser. No. 62/898,188 having a filing date of Sep. 10, 2019; U.S. Provisional Patent Application Ser. No. 62/925,274 having a filing date of Oct. 24, 2019; U.S. Provisional Patent Application Ser. No. 62/951,039 having a filing date of Dec. 20, 2019; U.S. Provisional Patent Application Ser. No. 62/972,195 having a filing date of Feb. 10, 2020; U.S. Provisional Patent Application Ser. No. 62/994,314 having a filing date of Mar. 25, 2020; U.S. Provisional Patent Application Ser. No. 63/008,979 having a filing date of Apr. 13, 2020; U.S. Provisional Patent Application Ser. No. 63/024,557 having a filing date of May 14, 2020; U.S. Provisional Application Ser. No. 63/038,959 having a filing date of Jun. 15, 2020, and U.S. Provisional Application Ser. No. 63/056,842 having a filing date of Jul. 27, 2020, which are incorporated herein by reference in their entirety.

BACKGROUND OF THE INVENTION

High frequency radio signal communication has increased in popularity. For example, the demand for increased data transmission speed for wireless smartphone connectivity has driven demand for high frequency components, including those configured to operate at 5G spectrum frequencies. Transmitting and receiving at such frequencies generally requires antennas with smaller scale features. A trend towards miniaturization has further increased the desirability of small, high frequency 5G antennas. 5G antennas can employ a variety of materials. The properties of such materials, however, can limit miniaturization and/or negatively affect high frequency performance capabilities of the 5G antennas.

As such, a need exists for high performance materials for 5G antennas to achieve miniaturization and improved antenna performance.

SUMMARY OF THE INVENTION

In accordance with one embodiment of the present invention, a 5G antenna system is disclosed that comprises a substrate and at least one antenna element configured to transmit and receive 5G radio frequency signals. The antenna element is coupled to the substrate. The substrate comprises a polymer composition that comprises a polymer matrix containing at least one polymer having a glass transition temperature of about 30° C. or more and at least one laser activatable additive wherein the polymer composition exhibits a dissipation factor of about 0.1 or less, as determined at a frequency of 2 GHz.

Other features and aspects of the present invention are set forth in greater detail below.

BRIEF DESCRIPTION OF THE FIGURES

A full and enabling disclosure of the present invention, including the best mode thereof to one skilled in the art, is set forth more particularly in the remainder of the specification, including reference to the accompanying figures, in which:

FIG. 3 illustrates an enlarged view of a portion of the user computing device of FIG. 2A;

DETAILED DESCRIPTION

Figure 1:
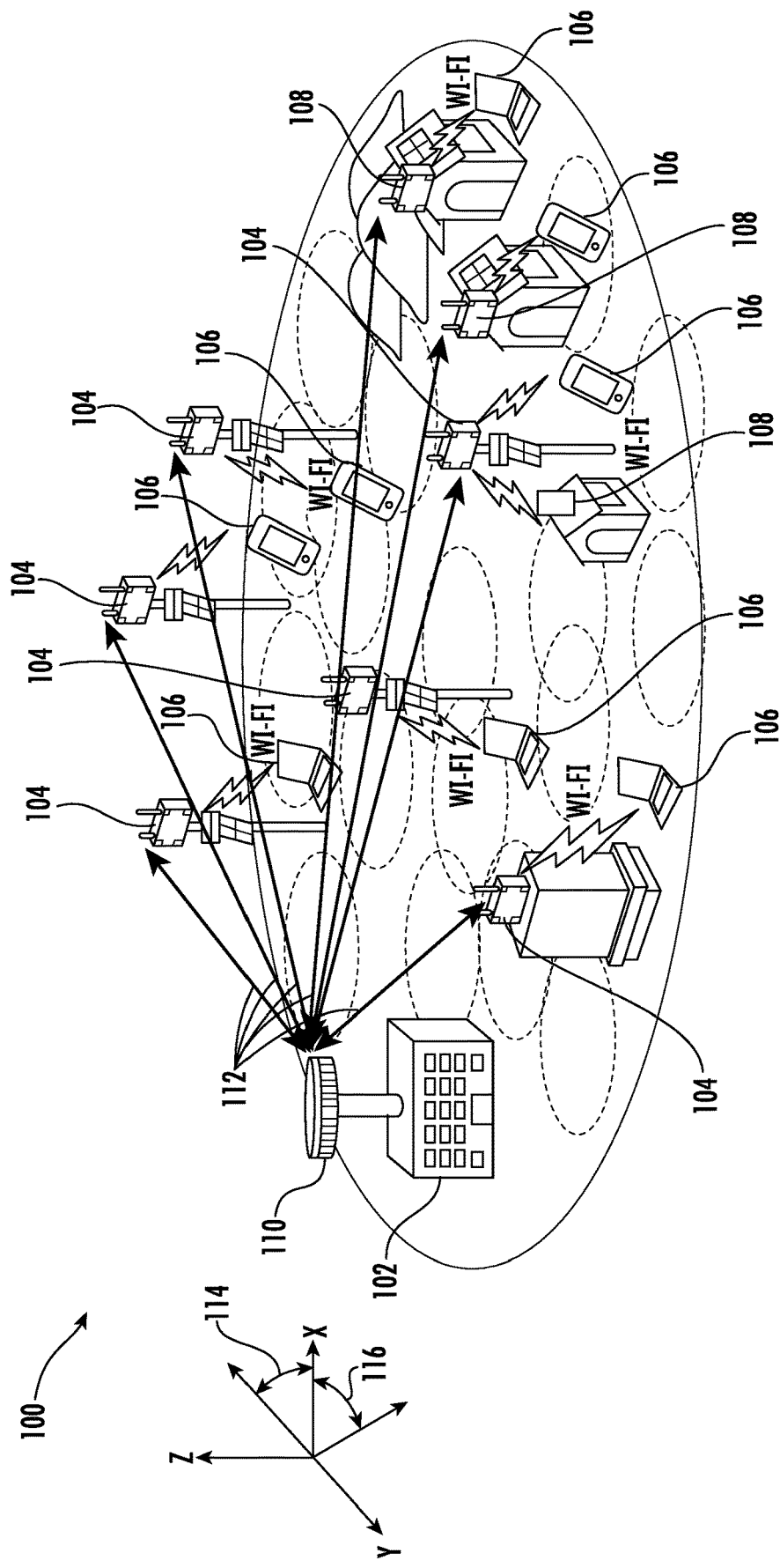
FIG. 1 depicts a 5G antenna system including a base station, one or more relay stations, one or more user computing devices, one or more Wi-Fi repeaters according to aspects of the present disclosure.

It is to be understood by one of ordinary skill in the art that the present discussion is a description of exemplary embodiments only, and is not intended as limiting the broader aspects of the present invention.

Generally speaking, the present invention is directed to a 5G antenna system including a substrate and at least one antenna element configured to transmit and receive 5G radio frequency signals wherein the at least one antenna element coupled to the substrate. The substrate is formed from a polymer composition that comprises a polymer matrix containing at least one polymer having a glass transition temperature of about 30° C. or more and at least one laser activatable additive wherein the polymer composition exhibits a dissipation factor of about 0.1 or less, as determined at a frequency of 2 GHz.

In this regard, the polymer composition has desired dielectric properties that enable its use within the antenna system. For example, the dissipation factor, a measure of the loss rate of energy, of the polymer composition may be relatively low which may assist in minimizing signal loss when utilized for a particular application, such as in signal transfer applications and in particular those related to 5G communications. In this regard, the dissipation factor may be about 0.1 or less, in some embodiments about 0.05 or less, in some embodiments about 0.01 or less, in some embodiments from about 0.0001 to about 0.008, and in some embodiments from about 0.0002 to about 0.006 over typical 5G frequencies (e.g., 2 or 10 GHz). In fact, in some cases, the dissipation factor may be very low, such as about 0.003 or less, in some embodiments about 0.002 or less, in some embodiments about 0.001 or less, in some embodiments, about 0.0009 or less, in some embodiments about 0.0008 or less, and in some embodiments, from about 0.0001 to about 0.0007 over typical 5G frequencies (e.g., 2 or 10 GHz).

In addition to having a low dissipation factor, in one embodiment, the polymer composition may exhibit a desired dielectric constant. The dielectric constant may be relatively high or relatively low depend on the particular use. Regardless of the application, the dielectric constant may allow for multiple conductive elements (e.g., antennae) to be employed that operate simultaneously with only a minimal level of electrical interference. In one embodiment, for instance, the polymer composition may exhibit a low dielectric constant of about 4 or less, in some embodiments about 3.9 or less, in some embodiments from about 0.1 to about 3.8 and in some embodiments, from about 1 to about 3.7, in some embodiments, from about 1.5 to about 3.6, in some embodiments from about 2 to about 3.5, and in some embodiments, from about 2.5 to about 3.4 over typical 5G frequencies (e.g., 2 or 10 GHz). In other embodiments, however, the polymer composition may exhibit a high dielectric constant of about 4 or more, in some embodiments about 4.5 or more, in some embodiments about 5 or more, in some embodiments about 8 or more, in some embodiments from about 10 to about 40, and in some embodiments from about 15 to about 30 over typical 5G frequencies (e.g., 2 or 10 GHz). Notably, the present inventors have also surprisingly discovered that the dielectric constant and dissipation factor can be maintained within the ranges noted above even when exposed to various temperatures, such as a temperature of from about −30° C. to about 100° C. For example, when subjected to a heat cycle test as described herein, the ratio of the dielectric constant after heat cycling to the initial dielectric constant may be about 0.8 or more, in some embodiments about 0.9 or more, and in some embodiments, from about 0.91 to about 0.99. Likewise, the ratio of the dissipation after being exposed to the high temperature to the initial dissipation factor may be about 1 or less, in some embodiments about 0.95 or less, in some embodiments from about 0.1 to about 0.9, and in some embodiments, from about 0.2 to about 0.8. The change in dissipation factor (i.e., the initial dissipation factor—the dissipation factor after heat cycling) may also range from about −0.1 to about 0.1, in some embodiments from about −0.05 to about 0.01, and in some embodiments, from about −0.001 to 0.

Conventionally, it was believed that polymer compositions exhibiting a low dissipation factor would not also possess sufficiently good thermal, mechanical properties and ease in processing (i.e., low viscosity) to enable their use in certain types of applications. Contrary to conventional thought, however, the polymer composition has been found to possess both excellent thermal, mechanical properties and processability. For example, the melting temperature of the polymer composition may, for instance, be about 180° C. or more, in some embodiments about 200° C., in some embodiments from about 210° C. to about 400° C., and in some embodiments from about 220° C. to about 380° C. Even at such melting temperatures, the ratio of the deflection temperature under load ("DTUL"), a measure of short term heat resistance, to the melting temperature may still remain relatively high. For example, the ratio may range from about 0.5 to about 1.00, in some embodiments from about 0.6 to about 0.95, and in some embodiments from about 0.65 to about 0.85. The specific DTUL values may, for instance, be about 200° C. or more, in some embodiments from about 200° C. to about 350° C., in some embodiments from about 210° C. to about 320° C., and in some embodiments from about 230° C. to about 290° C. Such high DTUL values can, among other things, allow the use of high speed and reliable surface mounting processes for mating the structure with other components of the electrical component.

The polymer composition may also possess excellent mechanical properties, which can be useful when forming substrates. For example, the polymer composition may exhibit a tensile strength of about 10 MPa or more, in some embodiments about 50 MPa or more, in some embodiments from about 70 MPa to about 300 MPa, and in some embodiments from about 80 MPa to about 200 MPa. The polymer composition may exhibit a tensile elongation of about 0.3% or more, in some embodiments about 0.4% or more, in some embodiments from about 0.5% to about 4%, and in some embodiments from about 0.5% to about 2%. The polymer composition may exhibit a tensile modulus of about 5,000 MPa or more, in some embodiments about 6,000 MPa or more, in some embodiments about 7,000 MPa to about 25,000 MPa, and in some embodiments from about 10,000 MPa to about 20,000 MPa. The tensile properties may be determined at a temperature of 23° C. in accordance with ISO Test No. 527:2012.

Also, the polymer composition may exhibit a flexural strength of about 20 MPa or more, in some embodiments about 10 MPa or more, in some embodiments about 50 MPa or more, in some embodiments from about 70 MPa to about 300 MPa, and in some embodiments from about 80 MPa to about 200 MPa. The polymer composition may exhibit a flexural elongation of about 0.4% or more, in some embodiments from about 0.5% to about 4%, and in some embodiments from about 0.5% to about 2%. The polymer composition may exhibit a flexural modulus of about 5,000 MPa or more, in some embodiments about 6,000 MPa or more, in some embodiments about 7,000 MPa to about 25,000 MPa, and in some embodiments from about 10,000 MPa to about 20,000 MPa. The flexural properties may be determined at a temperature of 23° C. in accordance with 178:2010.

Furthermore, the polymer composition may also possess a high impact strength, which may be useful when forming thin substrates. The polymer composition may, for instance, possess a Charpy notched impact strength of about 3 kJ/m$^2$ or more, in some embodiments about 5 kJ/m$^2$ or more, in some embodiments about 7 kJ/m$^2$ or more, in some embodiments from about 8 kJ/m$^2$ to about 40 kJ/m$^2$, and in some embodiments from about 10 kJ/m$^2$ to about 25 kJ/m$^2$. The impact strength may be determined at a temperature of 23° C. in accordance with ISO Test No. ISO 179-1:2010.

As a result of the properties noted above, the polymer composition can be readily shaped into a substrate that can be subsequently applied with one or more conductive elements, such as by using a laser direct structuring process ("LDS"). Due to the beneficial properties of the polymer composition, the resulting substrate may have a very small size, such as a thickness of about 5 millimeters or less, in some embodiments about 4 millimeters or less, and in some embodiments from about 0.5 to about 3 millimeters.

In particular, the substrates may be utilized for antennas. For example, the polymer composition may be utilized for high frequency antennas and antenna arrays for use in base stations, repeaters (e.g., "femtocells"), relay stations, terminals, user devices, and/or other suitable components of 5G systems. As used herein, "5G" generally refers to high speed data communication over radio frequency signals. 5G networks and systems are capable of communicating data at much faster rates than previous generations of data communication standards (e.g., "4G", "LTE"). Various standards and specifications have been released quantifying the requirements of 5G communications. As one example, the International Telecommunications Union (ITU) released the International Mobile Telecommunications-2020 ("IMT-2020") standard in 2015. The IMT-2020 standard specifies various data transmission criteria (e.g., downlink and uplink data rate, latency, etc.) for 5G. The IMT-2020 Standard defines uplink and downlink peak data rates as the minimum data rates for uploading and downloading data that a 5G system must support. The IMT-2020 standard sets the downlink peak data rate requirement as 20 Gbit/s and the uplink peak data rate as 10 Gbit/s.

As another example, 3$^{rd}$ Generation Partnership Project (3GPP) recently released new standards for 5G, referred to as "5G NR." 3GPP published "Release 15" in 2018 defining "Phase 1" for standardization of 5G NR. 3GPP defines 5G frequency bands generally as "Frequency Range 1" (FR1) including sub-6 GHz frequencies and "Frequency Range 2" (FR2) as frequency bands ranging from 20-60 GHz. However, as used herein "5G frequencies" can refer to systems utilizing frequencies greater than 60 GHz, for example ranging up to 80 GHz, up to 150 GHz, and up to 300 GHz. As used herein, "5G frequencies" can refer to frequencies that are about 2.5 GHz or higher, in some embodiments about 3.0 GHz or higher, in some embodiments from about 3 GHz to about 300 GHz, or higher, in some embodiments from about 4 GHz to about 80 GHz, in some embodiments from about 5 GHz to about 80 GHz, in some embodiments from about 20 GHz to about 80 GHz, and in some embodiments from about 28 GHz to about 60 GHz.

Antenna elements/arrays and systems described herein can satisfy or qualify as "5G" under standards released by 3GPP, such as Release 15 (2018), and/or the IMT-2020 Standard. To achieve such high speed data communication at high frequencies, antenna elements and arrays generally employ small feature sizes/spacing (e.g., fine pitch technology) and/or advanced materials that can improve antenna performance. For example, the feature size (spacing between antenna elements, width of antenna elements) etc. is generally dependent on the wavelength ("λ") of the desired transmission and/or reception radio frequency propagating through the substrate dielectric on which the antenna element is formed (e.g., nλ/4 where n is an integer). Further, beamforming and/or beam steering can be employed to facilitate receiving and transmitting across multiple frequency ranges or channels (e.g., multiple-in-multiple-out (MIMO), massive MIMO).

The high frequency 5G antenna elements can have a variety of configurations according to aspects of the present disclosure. For example, the 5G antenna elements can be or include co-planar waveguide elements, patch arrays (e.g., mesh-grid patch arrays), other suitable 5G antenna configurations. The antenna elements can be configured to provide MIMO, massive MIMO functionality, beam steering, and the like.

As used herein "massive" MIMO functionality generally refers to providing a large number transmission and receiving channels with an antenna array, for example 8 transmission (Tx) and 8 receive (Rx) channels (abbreviated as 8×8). Massive MIMO functionality may be provided with 8×8, 12×12, 16×16, 32×32, 64×64, or greater.

The antenna elements can have a variety of configurations and arrangements and can be fabricated using a variety of manufacturing techniques. As one example, the antenna elements and/or associated elements (e.g., ground elements, feed lines, and the like) can employ fine pitch technology. Fine pitch technology generally refers to small or fine spacing between their components or leads. For example, feature dimensions and/or spacing between antenna elements (or between an antenna element and a ground plane) can be about 1,500 micrometers or less, in some embodiments 1,250 micrometers or less, in some embodiments 750 micrometers or less (e.g., center-to-center spacing of 1.5 mm or less), 650 micrometers or less, in some embodiments 550 micrometers or less, in some embodiments 450 micrometers or less, in some embodiments 350 micrometers or less, in some embodiments 250 micrometers or less, in some embodiments 150 micrometers or less, in some embodiments 100 micrometers or less, and in some embodiments 50 micrometers or less. However, it should be understood that feature sizes and/or spacings that are smaller and/or larger may be employed within the scope of this disclosure.

As a result of such small feature dimensions, antenna configurations and/or arrays can be achieved with a large number of antenna elements in a small footprint. For example, an antenna array can have an average antenna element concentration of greater than 1,000 antenna elements per square centimeter, in some embodiments greater than 2,000 antenna elements per square centimeter, in some embodiments greater than 3,000 antenna elements per square centimeter, in some embodiments greater than 4,000 antenna elements per square centimeter, in some embodiments greater than 6,000 antenna elements per square centimeter, and in some embodiments greater than about 8,000 antenna elements per square centimeter. Such compact arrangement of antenna elements can provide a greater number of channels for MIMO functionality per unit area of the antenna area. For example, the number of channels can correspond with (e.g., be equal to or proportional with) the number of antenna elements.

Referring to FIG. 1, a 5G antenna system 100 can include a base station 102, one or more relay stations 104, one or more user computing devices 106, one or more Wi-Fi repeaters 108 (e.g., "femtocells"), and/or other suitable antenna components for the 5G antenna system 100. The relay stations 104 can be configured to facilitate communication with the base station 102 by the user computing devices 106 and/or other relay stations 104 by relaying or "repeating" signals between the base station 102 and the user computing devices 106 and/or relay stations 104. The base station 102 can include a MIMO antenna array 110 configured to receive and/or transmit radio frequency signals 112 with the relay station(s) 104, Wi-Fi repeaters 108, and/or directly with the user computing device(s) 106. The user computing device 106 is not necessarily limited by the present invention and include devices such as 5G smartphones.

The MIMO antenna array 110 can employ beam steering to focus or direct radio frequency signals 112 with respect to the relay stations 104. For example, the MIMO antenna array 110 can be configured to adjust an elevation angle 114 with respect to an X-Y plane and/or a heading angle 116 defined in the Z-Y plane and with respect to the Z direction.

Similarly, one or more of the relay stations 104, user computing devices 106, Wi-Fi repeaters 108 can employ beam steering to improve reception and/or transmission ability with respect to MIMO antenna array 110 by directionally tuning sensitivity and/or power transmission of the device 104, 106, 108 with respect to the MIMO antenna array 110 of the base station 102 (e.g., by adjusting one or both of a relative elevation angle and/or relative azimuth angle of the respective devices).

Figure 2A:
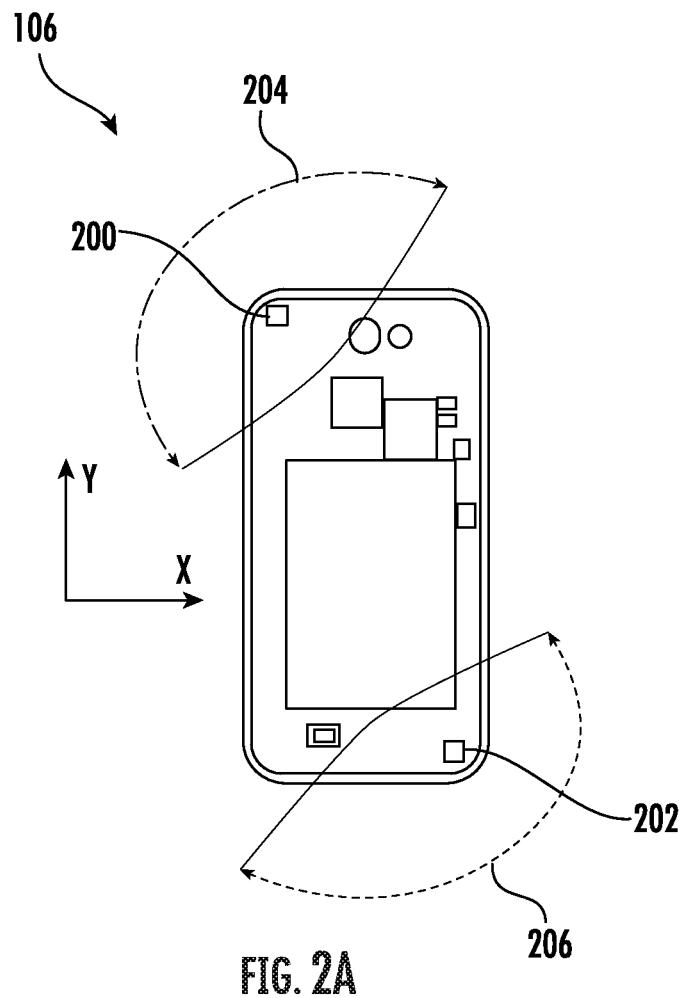
FIG. 2A illustrates a top-down view of an example user computing device including 5G antennas according to aspects of the present disclosure.
Figure 2B:
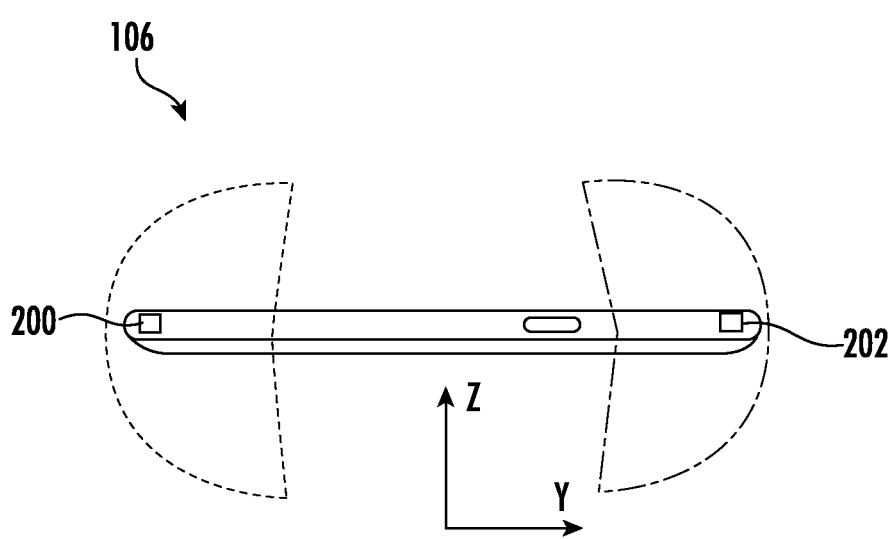
FIG. 2B illustrates a side elevation view of the example user computing device of FIG. 2A including 5G antennas according to aspects of the present disclosure.

FIGS. 2A and 2B illustrate a top-down and side elevation view, respectively, of an example user computing device 106. The user computing device 106 may include one or more antenna elements 200, 202 (e.g., arranged as respective antenna arrays). Referring to FIG. 2A, the antenna elements 200, 202 can be configured to perform beam steering in the X-Y plane (as illustrated by arrows 204, 206 and corresponding with a relative azimuth angle). Referring to FIG. 2B, the antenna elements 200, 202 can be configured to perform beam steering in the Z-Y plane (as illustrated by arrows 204, 206).

FIG. 3 depicts a simplified schematic view of a plurality of antenna arrays 302 connected using respective feed lines 304 (e.g., with a front end module). The antenna arrays 302 can be mounted to a side surface 306 of the substrate 308, for example as described and illustrated with respect to FIGS. 4A through 4C. The antenna arrays 302 can include a plurality of vertically connected elements (e.g., as a mesh-grid array). Thus, the antenna array 302 can generally extend parallel with the side surface 306 of the substrate 308. Shielding can optionally be provided on the side surface 306 of the substrate 308 such that the antenna arrays 302 are located outside of the shielding with respect to the substrate 308.

The vertical spacing distance between the vertically connected elements of the antenna array 302 can correspond with the "feature sizes" of the antenna arrays 302. As such, in some embodiments, these spacing distances may be relatively small (e.g., less than about 750 micrometers) such that the antenna array 302 is a "fine pitch" antenna array 302.

Figure 4:
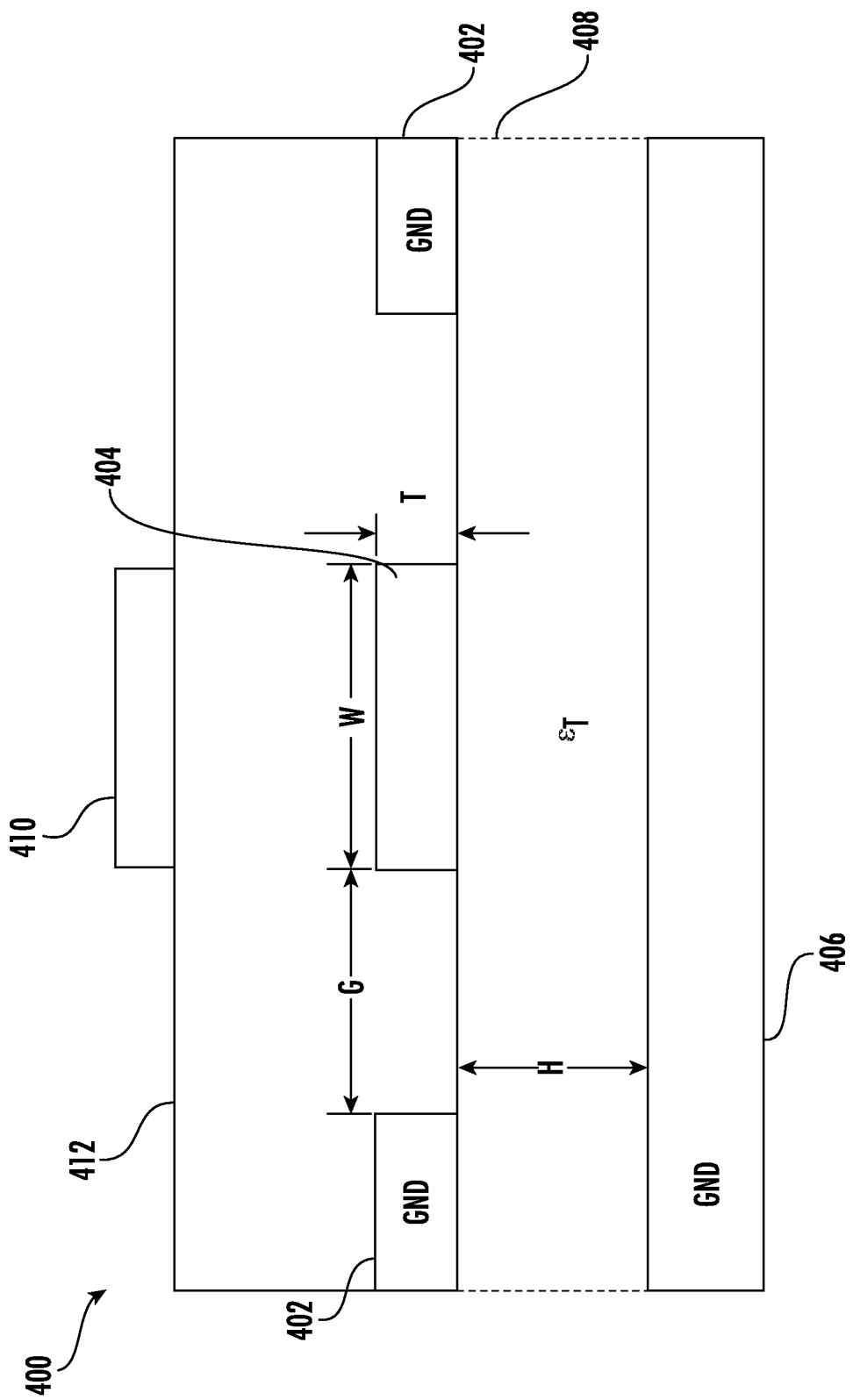
FIG. 4 illustrates a side elevation view of co-planar waveguide antenna array configuration according to aspects of the present disclosure.

FIG. 4 illustrates a side elevation view of a co-planar waveguide antenna 400 configuration according to aspects of the present disclosure. One or more co-planar ground layers 402 can be arranged parallel with an antenna element 404 (e.g., a patch antenna element). Another ground layer 406 may be spaced apart from the antenna element by a substrate 408. One or more additional antenna elements 410 can be spaced apart from the antenna element 404 by a second layer or substrate 412.

The dimensions "G" and "W" may correspond with "feature sizes" of the antenna 400. The "G" dimension may correspond with a distance between the antenna element 404 and the co-planar ground layer(s) 406. The "W" dimension can correspond with a width (e.g., linewidth) of the antenna element 404. As such, in some embodiments, dimensions "G" and "W" may be relatively small (e.g., less than about 750 micrometers) such that the antenna 400 is a "fine pitch" antenna 400.

Figure 5A:
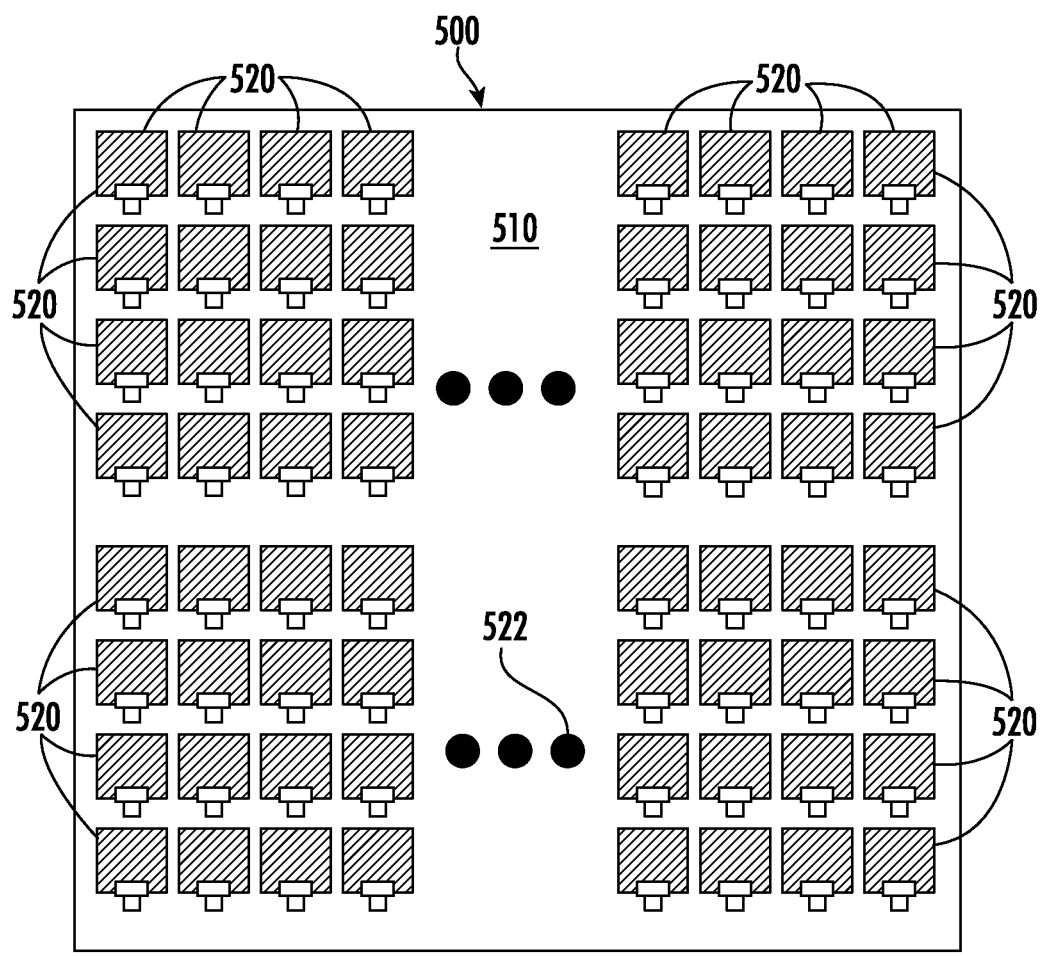
FIG. 5A illustrates an antenna array for massive multiple-in-multiple-out configurations according to aspects of the present disclosure.

FIG. 5A illustrates an antenna array 500 according to aspect of the present disclosure. The antenna array 500 can include a substrate 510 and a plurality of antenna elements 520 formed thereon. The plurality of antenna elements 520 can be approximately equally sized in the X- and/or Y-directions (e.g., square or rectangular). The plurality of antenna elements 520 can be spaced apart approximately equally in the X- and/or Y-directions. The dimensions of the antenna elements 520 and/or spacing therebetween can correspond with "feature sizes" of the antenna array 500. As such, in some embodiments, the dimensions and/or spacing may be relatively small (e.g., less than about 750 micrometers) such that the antenna array 500 is a "fine pitch" antenna array 500.

As illustrated by the ellipses 522, the number of columns of antenna elements 520 illustrated in FIG. 5 is provided as an example only. Similarly, the number of rows of antenna element 520 is provided as an example only.

The tuned antenna array 500 can be used to provide massive MIMO functionality, for example in a base station (e.g., as described above with respect to FIG. 1). More specifically, radio frequency interactions between the various elements can be controlled or tuned to provide multiple transmitting and/or receiving channels. Transmitting power and/or receiving sensitivity can be directionally controlled to focus or direct radio frequency signals, for example as described with respect to the radio frequency signals 112 of FIG. 1.

The tuned antenna array 500 can provide a large number of antenna elements 522 in a small footprint. For example, the tuned antenna 500 can have an average antenna element concentration of 1,000 antenna elements per square cm or greater. Such compact arrangement of antenna elements can provide a greater number of channels for MIMO functionality per unit area. For example, the number of channels can correspond with (e.g., be equal to or proportional with) the number of antenna elements.

Figure 5C:
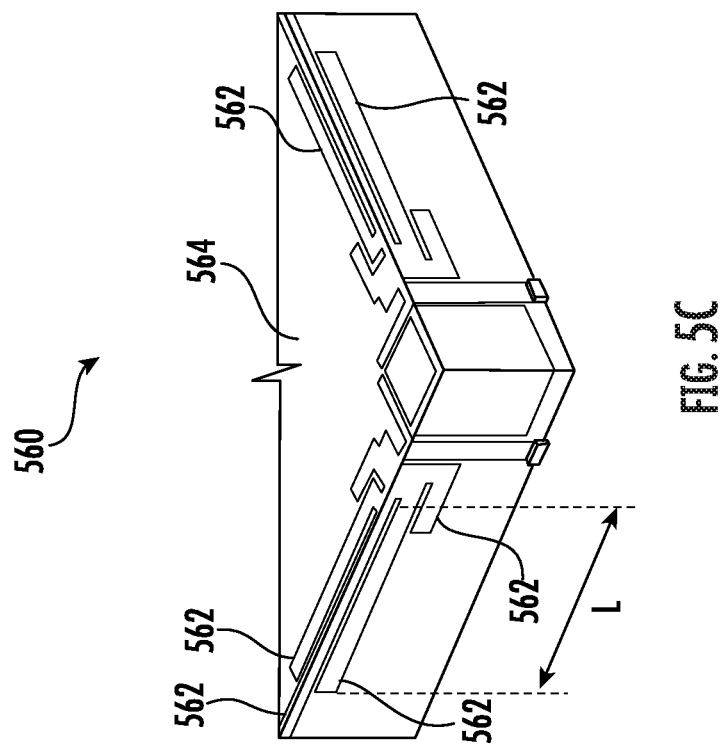
FIG. 5C illustrates an example antenna configuration according to aspects of the present disclosure.
Figure 5B:
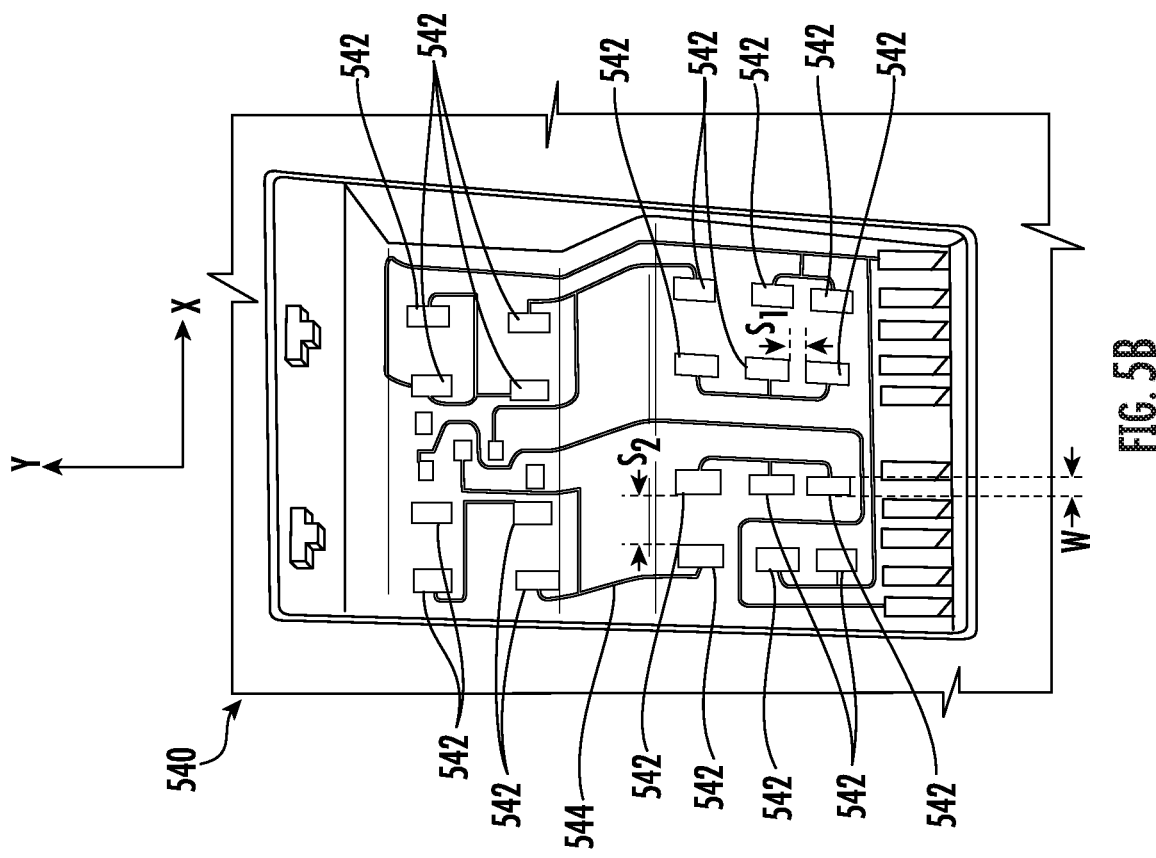
FIG. 5B illustrates an antenna array formed with laser direct structuring according to aspects of the present disclosure.

FIG. 5B illustrates an antenna array 540 formed with laser direct structuring according to aspects of the present disclosure. The antenna array 540 can include a plurality of antenna elements 542 and plurality of feed lines 544 connecting the antenna elements 542 (e.g., with other antenna elements 542, a front end module, or other suitable component). The antenna elements 542 can have respective widths "w" and spacing distances "$S_1$" and "$S_2$" therebetween (e.g., in the X-direction and Y-direction, respectively). These dimensions can be selected to achieve 5G radio frequency communication at a desired 5G frequency. More specifically, the dimensions can be selected to tune the antenna array 540 for transmission and/or reception of data using radio frequency signals that are within the 5G frequency spectrum (e.g., greater than 2.5 GHz and/or greater than 3 GHz and/or greater than 28 GHz). The dimensions can be selected based on the material properties of the substrate. For example, one or more of "w", "$S_1$," or "$S_2$" can correspond with a multiple of a propagation wavelength ("λ") of the desired frequency through the substrate material (e.g., nλ/4 where n is an integer).

As one example, λ can be calculated as follows:

$$\lambda = \frac{c}{f\sqrt{\epsilon_R}}$$

where c is the speed of light in a vacuum, $\epsilon_R$ is the dielectric constant of the substrate (or surrounding material), f is the desired frequency.

FIG. 5C illustrates an example antenna configuration 560 according to aspects of the present disclosure. The antenna configuration 560 can include multiple antenna elements 562 arranged in parallel long edges of a substrate 564. The various antenna elements 562 can have respective lengths, "L" (and spacing distances therebetween) that tune the antenna configuration 560 for reception and/or transmission at a desired frequency and/or frequency range. More specifically, such dimensions can be selected based on a propagation wavelength, λ, at the desired frequency for the substrate material, for example as described above with reference to FIG. 5B.

Figure 6C:
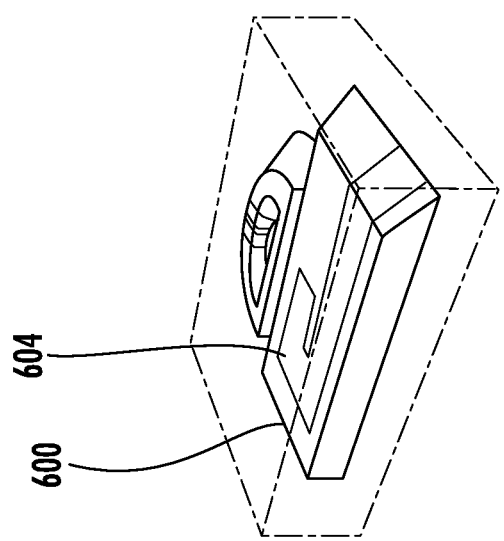
FIGS. 6A through 6C depict simplified sequential diagrams of a laser direct structuring manufacturing process that can be used to form antenna elements and/or arrays according to aspects of the present disclosure.
Figure 6B:
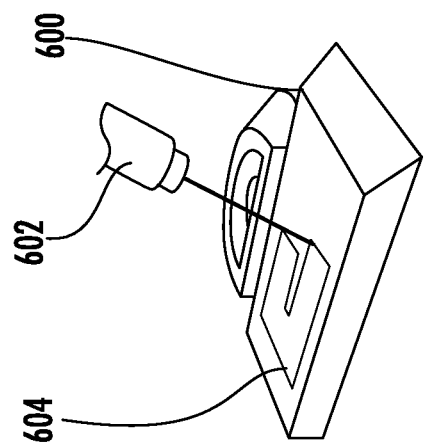
Figure 6A:
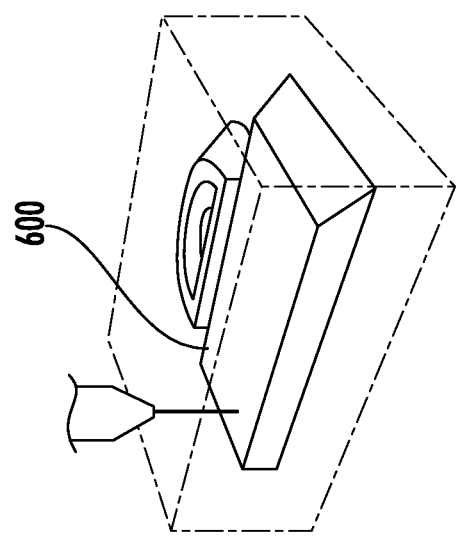

FIGS. 6A through 6C depict simplified sequential diagrams of a laser direct structuring manufacturing process that can be used to form antenna elements and/or arrays according to aspects of the present disclosure. Referring to FIG. 6A, a substrate 600 can be formed using injection molding to form the desired shape. The substrate 600 can include a variety of materials, such as a polymer composition containing a laser activatable additive.

Referring to FIG. 6B, a laser 602 can be used to activate the laser activatable additive to form a circuit pattern 604 that can include one or more of the antenna elements and/or arrays. For example, the laser can melt conductive particles in the polymer composition to form the circuit pattern 604.

Referring to FIG. 6C, the substrate 600 can be submerged in an electroless copper bath to plate the circuit pattern 604 and form the antenna elements, elements arrays, other components, and/or conductive lines therebetween.

Various embodiments of the present invention will now be described in more detail.

I. Polymer Composition

A. Polymer Matrix

Any of a variety of polymers or combinations of polymers may generally be employed in the polymer matrix. For example, the polymer may be semi-crystalline or crystalline in nature. In one embodiment, the polymer may be semi-crystalline. In another embodiment, the polymer may be crystalline. In addition, in one embodiment, the polymer may be an aromatic polymer. Alternatively, in another embodiment, the polymer may be an aliphatic polymer.

Suitable polymers may include thermoplastic polymers. For example, these polymers may include, for instance, polyolefins (e.g., ethylene polymers, propylene polymers, etc.), polyamides (e.g., aliphatic, semi-aromatic, or aromatic polyamides), polyesters (e.g., polyethylene terephthalate, polybutylene terephthalate, liquid crystalline polymers), polyarylene sulfides, polyetherimides, polyacetals (e.g., polyoxymethylene), polyphenylene oxides, polyarylketones (e.g., polyetheretherketone, polyetherketoneketone, etc.), polycarbonates, etc., as well as blends thereof.

Regardless, the polymers may be generally considered "high performance" polymers such that they have a relatively high glass transition temperature and/or high melting temperature. Such high performance polymers can thus provide a substantial degree of heat resistance to the polymer composition. For example, the polymer may have a glass transition temperature of about 30° C. or more, in some embodiments about 40° C. or more, in some embodiments from about 50° C. to about 250° C., in some embodiments from about 60° C. to about 150° C. The polymer may also have a melting temperature of about 180° C. or more, in some embodiments about 200° C. or more, in some embodiments from about 210° C. to about 400° C., in some embodiments from about 220° C. to about 380° C. The glass transition and melting temperatures may be determined as is well known in the art using differential scanning calorimetry ("DSC"), such as determined by ISO Test No. 11357-2:2013 (glass transition) and 11357-3:2011 (melting).

One example of a suitable semi-crystalline aromatic polymer, for instance, is an aromatic polyester that is a condensation product of an aromatic dicarboxylic acid having 8 to 14 carbon atoms and at least one diol. Suitable diols may include, for instance, neopentyl glycol, cyclohexanedimethanol, 2,2-dimethyl-1,3-propane diol and aliphatic glycols of the formula HO(CH$_2$)$_n$OH where n is an integer of 2 to 10. Suitable aromatic dicarboxylic acids may include, for instance, isophthalic acid, terephthalic acid, 1,2-di(p-carboxyphenyl)ethane, 4,4'-dicarboxydiphenyl ether, etc., as well as combinations thereof. Fused rings can also be present such as in 1,4- or 1,5- or 2,6-naphthalene-dicarboxylic acids. Particular examples of such aromatic polyesters may include, for instance, poly(ethylene terephthalate) (PET), poly(1,4-butylene terephthalate) (PBT), poly(1,3-propylene terephthalate) (PPT), poly(1,4-butylene 2,6-naphthalate) (PBN), poly(ethylene 2,6-naphthalate) (PEN), poly(1,4-cyclohexylene dimethylene terephthalate) (PCT), and copolymers and mixtures of the foregoing.

In one particular embodiment, the polymer may include a polybutylene terephthalate. The polybutylene terephthalate may have a crystallinity of about 38% or more, in some embodiments about 40% or more, and in some embodiments about 45% or more. The crystallinity of the polybutylene terephthalate polymer may generally be about 70% or less, in some embodiments about 65% or less, and in some embodiments about 60% or less. The percent crystallinity may be determined using differential scanning calorimetry (DSC). Such analysis may be performed using a Pyris 6 DSC from PerkinElmer instruments. A detailed description of the calculation is available from Sichina, W. J. "DSC as problem solving tool: measurement of percent crystallinity of thermoplastics." Thermal Analysis Application Note (2000).

In addition, modified or copolymers of polyethylene terephthalate polymers and/or polybutylene terephthalate polymers may also be used. For instance, in one embodiment, a modifying acid or a modifying diol may be used to produce modified polyethylene terephthalate polymers and/or modified polybutylene terephthalate polymers. As used herein, the terms "modifying acid" and "modifying diol" are meant to define compounds, which can form part of the acid and diol repeat units of a polyester, respectively, and which can modify a polyester to reduce its crystallinity or render the polyester amorphous. Of course, the polyesters may be non-modified and do not contain a modifying acid or a modifying diol. In any event, examples of modifying acid components may include, but are not limited to, isophthalic acid, phthalic acid, 1,3-cyclohexanedicarboxylic acid, 1,4-cyclohexane dicarboxylic acid, 2,6-naphthaline dicarboxylic acid, succinic acid, glutaric acid, adipic acid, sebacic acid, suberic acid, 1,12-dodecanedioic acid, etc. In practice, it is often preferable to use a functional acid derivative thereof such as the dimethyl, diethyl, or dipropyl ester of the dicarboxylic acid. The anhydrides or acid halides of these acids also may be employed where practical. Examples of modifying diol components may include, but are not limited to, neopentyl glycol, 1,4-cyclohexanedimethanol, 1,2-propanediol, 1,3-propanediol, 2-methy-1,3-propanediol, 1,4-butanediol, 1,6-hexanediol, 1,2-cyclohexanediol, 1,4-cyclohexanediol, 1,2-cyclohexanedimethanol, 1,3-cyclohexanedimethanol, 2,2,4,4-tetramethyl 1,3-cyclobutane diol, Z,8-bis(hydroxymethyltricyclo-[5.2.1.0]-decane wherein Z represents 3, 4, or 5; 1,4-bis(2-hydroxyethoxy)benzene, 4,4'-bis(2-hydroxyethoxy) diphenylether [bis-hydroxyethyl bisphenol A], 4,4'-Bis(2-hydroxyethoxy)diphenylsulfide [bis-hydroxyethyl bisphenol S] and diols containing one or more oxygen atoms in the chain, e.g., diethylene glycol, triethylene glycol, dipropylene glycol, tripropylene glycol, etc. In general, these diols contain 2 to 18, and in some embodiments 2 to 8 carbon atoms. Cycloaliphatic diols can be employed in their cis- or trans-configuration or as mixtures of both forms.

In some examples, at least one polyester or copolyester present in the polymer composition may have an intrinsic viscosity (IV) of from about 0.5 to about 0.9 dL/g, such as from about 0.5 to about 0.8 dL/g. In one embodiment, for instance, the intrinsic viscosity of the polyester is from about 0.65 to about 0.8 d L/g.

Polyarylene sulfides are also suitable semi-crystalline aromatic polymers. The polyarylene sulfide(s) employed in the composition generally have repeating units of the formula:

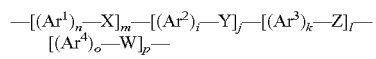

wherein, $Ar^1$, $Ar^2$, $Ar^3$, and $Ar^4$ are independently arylene units of 6 to 18 carbon atoms;

W, X, Y, and Z are independently bivalent linking groups selected from —SO₂—, —S—, —SO—, —CO—, —O—, —C(O)O— or alkylene or alkylidene groups of 1 to 6 carbon atoms, wherein at least one of the linking groups is —S—, and n, m, i, j, k, l, o, and p are independently 0, 1, 2, 3, or 4, subject to the proviso that their sum total is not less than 2.

The arylene units $Ar^1$, $Ar^2$, $Ar^3$, and $Ar^4$ may be selectively substituted or unsubstituted. Advantageous arylene units are phenylene, biphenylene, naphthylene, anthracene and phenanthrene. The polyarylene sulfide typically includes more than about 30 mol %, more than about 50 mol %, or more than about 70 mol % arylene sulfide (—S—) units. For example, the polyarylene sulfide may include at least 85 mol % sulfide linkages attached directly to two aromatic rings. In one particular embodiment, the polyarylene sulfide is a polyphenylene sulfide, defined herein as containing the phenylene sulfide structure —(C₆H₄—S)ₙ— (wherein n is an integer of 1 or more) as a component thereof.

Synthesis techniques that may be used in making a polyarylene sulfide are generally known in the art. By way of example, a process for producing a polyarylene sulfide can include reacting a material that provides a hydrosulfide ion (e.g., an alkali metal sulfide) with a dihaloaromatic compound in an organic amide solvent. The alkali metal sulfide can be, for example, lithium sulfide, sodium sulfide, potassium sulfide, rubidium sulfide, cesium sulfide or a mixture thereof. When the alkali metal sulfide is a hydrate or an aqueous mixture, the alkali metal sulfide can be processed according to a dehydrating operation in advance of the polymerization reaction. An alkali metal sulfide can also be generated in situ. In addition, a small amount of an alkali metal hydroxide can be included in the reaction to remove or react impurities (e.g., to change such impurities to harmless materials) such as an alkali metal polysulfide or an alkali metal thiosulfate, which may be present in a very small amount with the alkali metal sulfide.

The dihaloaromatic compound can be, without limitation, an o-dihalobenzene, m-dihalobenzene, p-dihalobenzene, dihalotoluene, dihalonaphthalene, methoxy-dihalobenzene, dihalobiphenyl, dihalobenzoic acid, dihalodiphenyl ether, dihalodiphenyl sulfone, dihalodiphenyl sulfoxide or dihalodiphenyl ketone. Dihaloaromatic compounds may be used either singly or in any combination thereof. Specific exemplary dihaloaromatic compounds can include, without limitation, p-dichlorobenzene; m-dichlorobenzene; o-dichlorobenzene; 2,5-dichlorotoluene; 1,4-dibromobenzene, 1,4-dichloronaphthalene; 1-methoxy-2,5-dichlorobenzene; 4,4'-dichlorobiphenyl; 3,5-dichlorobenzoic acid; 4,4'-dichlorodiphenyl ether; 4,4'-dichlorodiphenylsulfone; 4,4'-dichlorodiphenylsulfoxide; and 4,4'-dichlorodiphenyl ketone. The halogen atom can be fluorine, chlorine, bromine or iodine, and two halogen atoms in the same dihaloaromatic compound may be the same or different from each other. In one embodiment, o-dichlorobenzene, m-dichlorobenzene, p-dichlorobenzene or a mixture of two or more compounds thereof is used as the dihalo-aromatic compound. As is known in the art, it is also possible to use a monohalo compound (not necessarily an aromatic compound) in combination with the dihaloaromatic compound in order to form end groups of the polyarylene sulfide or to regulate the polymerization reaction and/or the molecular weight of the polyarylene sulfide.

The polyarylene sulfide(s) may be homopolymers or copolymers. For instance, selective combination of dihaloaromatic compounds can result in a polyarylene sulfide copolymer containing not less than two different units. For instance, when p-dichlorobenzene is used in combination with m-dichlorobenzene or 4,4'-dichlorodiphenylsulfone, a polyarylene sulfide copolymer can be formed containing segments having the structure of formula:

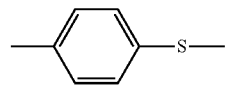

and segments having the structure of formula:

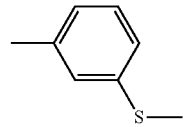

or segments having the structure of formula:

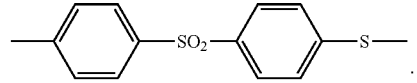

The polyarylene sulfide may be linear, semi-linear, branched or crosslinked. Linear polyarylene sulfides typically contain 80 mol % or more of the repeating unit —(Ar—S)—. Such linear polymers may also include a small amount of a branching unit or a cross-linking unit, but the amount of branching or cross-linking units is typically less than about 1 mol % of the total monomer units of the polyarylene sulfide. A linear polyarylene sulfide polymer may be a random copolymer or a block copolymer containing the above-mentioned repeating unit. Semi-linear polyarylene sulfides may likewise have a cross-linking structure or a branched structure introduced into the polymer a small amount of one or more monomers having three or more reactive functional groups. By way of example, monomer components used in forming a semi-linear polyarylene sulfide can include an amount of polyhaloaromatic compounds having two or more halogen substituents per molecule which can be utilized in preparing branched polymers. Such monomers can be represented by the formula $R'X_n$, where each X is selected from chlorine, bromine, and iodine, n is an integer of 3 to 6, and R' is a polyvalent aromatic radical of valence n which can have up to about 4 methyl substituents, the total number of carbon atoms in R' being within the range of 6 to about 16. Examples of some polyhaloaromatic compounds having more than two halogens substituted per molecule that can be employed in forming a semi-linear polyarylene sulfide include 1,2,3-trichlorobenzene, 1,2,4-trichlorobenzene, 1,3-dichloro-5-bromobenzene, 1,2,4-triiodobenzene, 1,2,3,5-tetrabromobenzene, hexachlorobenzene, 1,3,5-trichloro-2,4,6-trimethylbenzene, 2,2',4,4'-tetrachlorobiphenyl, 2,2',5,5'-tetra-iodobiphenyl, 2,2',6,6'-tetrabromo-3,3',5,5'-tetramethylbiphenyl, 1,2,3,4-tetrachloronaphthalene, 1,2,4-tribromo-6-methylnaphthalene, etc., and mixtures thereof.

Another example of a suitable semi-crystalline polymer may be a polyamide. For instance, the polyamide may be an aromatic polyamide in one embodiment. In this regard, the aromatic polyamide may have a relatively high melting temperature, such as about 200° C. or more, in some embodiments about 220° C. or more, and in some embodiments from about 240° C. to about 320° C., as determined using differential scanning calorimetry according to ISO Test No. 11357. The glass transition temperature of the aromatic polyamides is likewise generally from about 110° C. to about 160° C. In another embodiment, the aromatic polyamide may be an aliphatic polyamide. In this regard, the aliphatic polyamide may also have a relatively high melting temperature, such as about 180° C. or more, in some embodiments about 200° C. or more, and in some embodiments from about 210° C. to about 320° C., as determined using differential scanning calorimetry according to ISO Test No. 11357. The glass transition temperature of the aliphatic polyamides is likewise generally from about 30° C. to about 170° C.

Aromatic polyamides typically contain repeating units held together by amide linkages (NH—CO) and are synthesized through the polycondensation of dicarboxylic acids (e.g., aromatic dicarboxylic acids), diamines (e.g., aliphatic diamines), etc. For example, the aromatic polyamide may contain aromatic repeating units derived from an aromatic dicarboxylic acid, such as terephthalic acid, isophthalic acid, 2,6-naphthalenedicarboxylic acid, 2,7-naphthalenedicarboxylic acid, 1,4-naphthalenedicarboxylic acid, 1,4-phenylenedioxy-diacetic acid, 1,3-phenylenedioxy-diacetic acid, diphenic acid, 4,4'-oxydibenzoic acid, diphenylmethane-4,4'-dicarboxylic acid, diphenylsulfone-4,4'-dicarboxylic acid, 4,4'-biphenyldicarboxylic acid, etc., as well as combinations thereof. Terephthalic acid is particularly suitable. Of course, it should also be understood that other types of acid units may also be employed, such as aliphatic dicarboxylic acid units, polyfunctional carboxylic acid units, etc.

Aliphatic polyamides also typically contain repeating units held together by amide linkages (NH—CO). These polyamides can be synthesized through various techniques. For example, the polyamide may be formed by a ring-opening polymerization, such as a ring-opening polymerization of caprolactam. These polyamides may also be synthesized through the polycondensation of dicarboxylic acids (e.g., aliphatic dicarboxylic acids), diamines, etc. For example, the aromatic polyamide may contain aliphatic repeating units derived from an aliphatic dicarboxylic acid, such as adipic acid, suberic acid, azelaic acid, sebacic acid, undecanedioic acid, dodecanedioic acid, brassylic acid, tetradecanedioic acid, pentadecanedioic acid, hexadecanedioic acid, octadecanedioic acid, dimeric acid, the cis- and/or trans-cyclohexane-1,4-dicarboxylic acid, the cis- and/or trans-cyclohexane-1,3-dicarboxylic acid, etc. as well as combinations thereof. Adipic acid is particularly suitable.

The polyamide may also contain aliphatic repeating units derived from an aliphatic diamine, which typically has from 4 to 14 carbon atoms. Examples of such diamines include linear aliphatic alkylenediamines, such as 1,4-tetramethylenediamine, 1,6-hexanediamine, 1,7-heptanediamine, 1,8-octanediamine, 1,9-nonanediamine, 1,10-decanediamine, 1,11-undecanediamine, 1,12-dodecanediamine, etc.; branched aliphatic alkylenediamines, such as 2-methyl-1,5-pentanediamine, 3-methyl-1,5 pentanediamine, 2,2,4-trimethyl-1,6-hexanediamine, 2,4,4-trimethyl-1,6-hexanediamine, 2,4-dimethyl-1,6-hexanediamine, 2-methyl-1,8-octanediamine, 5-methyl-1,9-nonanediamine, etc.; as well as combinations thereof. Repeating units derived from 1,9-nonanediamine and/or 2-methyl-1,8-octanediamine are particularly suitable. Of course, other diamine units may also be employed, such as alicyclic diamines, aromatic diamines, etc.

Particularly suitable aromatic polyamides may include poly(nonamethylene terephthalamide) (PA9T), poly(nonamethylene terephthalamide/nonamethylene decanediamide) (PA9T/910), poly(nonamethylene terephthalamide/nonamethylene dodecanediamide) (PA9T/912), poly(nonamethylene terephthalam ide/11-aminoundecanamide) (PA9T/11), poly(nonamethylene terephthalamide/12-aminododecanamide) (PA9T/12), poly(decamethylene terephthalamide/11-aminoundecanamide) (PA 10T/11), poly(decamethylene terephthalamide/12-ainododecanamide) (PA10T/12), poly (decamethylene terephthalam ide/decamethylene decanediam ide) (PA10T/1010), poly(decamethylene terephthalamide/decamethylene dodecanediamide) (PA10T/1012), poly(decamethylene terephthalamide/tetramethylene hexanediamide) (PA10T/46), poly(decamethylene terephthalamide/caprolactam) (PA10T/6), poly(decamethylene terephthalamide/hexamethylene hexanediamide) (PA10T/66), poly(dodecamethylene terephthalamide/dodecamethylene dodecanediarnide) (PA12T/1212), poly(dodecamethylene terephthalamide/caprolactam) (PA12T/6), poly (dodecamethylene terephthalamide/hexamethylene hexanediamide) (PA12T/66), polyphthalamide (PPA), and so forth. Particularly suitable aliphatic polyamides may include polyamide 4,6, polyamide 5,10, polyamide 6, polyamide 6,6, polyamide 6,9, polyamide 6,10, polyamide 6,12, polyamide 11, polyamide 12, and so forth. Yet other examples of suitable aromatic polyamides are described in U.S. Pat. No. 8,324,307 to Harder, et al.

Another suitable semi-crystalline aromatic polymer that may be employed in the present invention is a polyaryletherketone. Polyaryletherketones are semi-crystalline polymers with a relatively high melting temperature, such as from about 300° C. to about 400° C., in some embodiments from about 310° C. to about 390° C., and in some embodiments from about 330° C. to about 380° C. The glass transition temperature may likewise be from about 110° C. to about 200° C. Particularly suitable polyaryletherketones are those that primarily include phenyl moieties in conjunction with ketone and/or ether moieties. Examples of such polymers include polyetheretherketone ("PEEK"), polyetherketone ("PEK"), polyetherketoneketone ("PEKK"), polyetherketoneetherketoneketone ("PEKEKK"), polyetheretherketoneketone ("PEEKK"), polyether-diphenyl-ether-ether-diphenyl-ether-phenyl-ketone-phenyl, etc., as well as blends and copolymers thereof.

In addition to the polymers referenced above, crystalline polymers may also be employed in the polymer composition. Particularly suitable are liquid crystalline polymers, which have a high degree of crystallinity that enables them to effectively fill the small spaces of a mold. Liquid crystalline polymers are generally classified as "thermotropic" to the extent that they can possess a rod-like structure and exhibit a crystalline behavior in their molten state (e.g., thermotropic nematic state). These polymers may also be generally referred to as polyesters. The polymers have a relatively high melting temperature, such as from about 250° C. to about 400° C., in some embodiments from about 280° C. to about 390° C., and in some embodiments from about 300° C. to about 380° C. Such polymers may be formed from one or more types of repeating units as is known in the art. A liquid crystalline polymer may, for example, contain one or more aromatic ester repeating units, typically in an amount of from about 60 mol. % to about 99.9 mol. %, in some embodiments from about 70 mol. % to about 99.5 mol. %, and in some embodiments from about 80 mol. % to about 99 mol. % of the polymer. The aromatic ester repeating units may be generally represented by the following Formula (I):

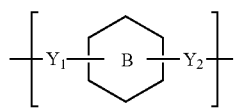

wherein, ring B is a substituted or unsubstituted 6-membered aryl group (e.g., 1,4-phenylene or 1,3-phenylene), a substituted or unsubstituted 6-membered aryl group fused to a substituted or unsubstituted 5- or 6-membered aryl group (e.g., 2,6-naphthalene), or a substituted or unsubstituted 6-membered aryl group linked to a substituted or unsubstituted 5- or 6-membered aryl group (e.g., 4,4-biphenylene); and $Y_1$ and $Y_2$ are independently O, C(O), NH, C(O)HN, or NHC(O).

Typically, at least one of $Y_1$ and $Y_2$ are C(O). Examples of such aromatic ester repeating units may include, for instance, aromatic dicarboxylic repeating units ($Y_1$ and $Y_2$ in Formula I are C(O)), aromatic hydroxycarboxylic repeating units ($Y_1$ is O and $Y_2$ is C(O) in Formula I), as well as various combinations thereof.

Aromatic dicarboxylic repeating units, for instance, may be employed that are derived from aromatic dicarboxylic acids, such as terephthalic acid, isophthalic acid, 2,6-naphthalenedicarboxylic acid, diphenyl ether-4,4'-dicarboxylic acid, 1,6-naphthalenedicarboxylic acid, 2,7-naphthalenedicarboxylic acid, 4,4'-dicarboxybiphenyl, bis(4-carboxyphenyl)ether, bis(4-carboxyphenyl)butane, bis(4-carboxyphenyl)ethane, bis(3-carboxyphenyl)ether, bis(3-carboxyphenyl)ethane, etc., as well as alkyl, alkoxy, aryl and halogen substituents thereof, and combinations thereof. Particularly suitable aromatic dicarboxylic acids may include, for instance, terephthalic acid ("TA"), isophthalic acid ("IA"), and 2,6-naphthalenedicarboxylic acid ("NDA"). When employed, repeating units derived from aromatic dicarboxylic acids (e.g., IA, TA, and/or NDA) each typically constitute from about 1 mol. % to about 40 mol. %, in some embodiments from about 2 mol. % to about 30 mol. %, and in some embodiments, from about 5 mol. % to about 25 mol. % of the polymer.

Aromatic hydroxycarboxylic repeating units may also be employed that are derived from aromatic hydroxycarboxylic acids, such as, 4-hydroxybenzoic acid; 4-hydroxy-4'-biphenylcarboxylic acid; 2-hydroxy-6-naphthoic acid; 2-hydroxy-5-naphthoic acid; 3-hydroxy-2-naphthoic acid; 2-hydroxy-3-naphthoic acid; 4'-hydroxyphenyl-4-benzoic acid; 3'-hydroxyphenyl-4-benzoic acid; 4'-hydroxyphenyl-3-benzoic acid, etc., as well as alkyl, alkoxy, aryl and halogen substituents thereof, and combination thereof. Particularly suitable aromatic hydroxycarboxylic acids are 4-hydroxybenzoic acid ("HBA") and 6-hydroxy-2-naphthoic acid ("HNA"). When employed, repeating units derived from hydroxycarboxylic acids (e.g., HBA and/or HNA) typically constitute about 20 mol. % or more, in some embodiments about 25 mol. % or more, in some embodiments about 30 mol. % or more, in some embodiments about 40 mol. % or more, in some embodiments about 50 mole % or more, in some embodiments from about 55 mol. % to 100 mol. %, and in some embodiments, from about 60 mol. % to about 95 mol. % of the polymer.

Other repeating units may also be employed in the polymer. In certain embodiments, for instance, repeating units may be employed that are derived from aromatic diols, such as hydroquinone, resorcinol, 2,6-dihydroxynaphthalene, 2,7-dihydroxynaphthalene, 1,6-dihydroxynaphthalene, 4,4'-dihydroxybiphenyl (or 4,4'-biphenol), 3,3'-dihydroxybiphenyl, 3,4'-dihydroxybiphenyl, 4,4'-dihydroxybiphenyl ether, bis(4-hydroxyphenyl)ethane, etc., as well as alkyl, alkoxy, aryl and halogen substituents thereof, and combinations thereof. Particularly suitable aromatic diols may include, for instance, hydroquinone ("HQ") and 4,4'-biphenol ("BP"). When employed, repeating units derived from aromatic diols (e.g., HQ and/or BP) typically constitute from about 1 mol. % to about 50 mol. %, in some embodiments from about 1 mol. % to about 40 mol. %, in some embodiments from about 2 mol. % to about 40 mol. %, in some embodiments from about 5 mol. % to about 35 mol. %, and in some embodiments, from about 5 mol. % to about 25 mol. % of the polymer. Repeating units may also be employed, such as those derived from aromatic amides (e.g., acetaminophen ("APAP")) and/or aromatic amines (e.g., 4-aminophenol ("AP"), 3-aminophenol, 1,4-phenylenediamine, 1,3-phenylenediamine, etc.). When employed, repeating units derived from aromatic amides (e.g., APAP) and/or aromatic amines (e.g., AP) typically constitute from about 0.1 mol. % to about 20 mol. %, in some embodiments from about 0.5 mol. % to about 15 mol. %, and in some embodiments from about 1 mol. % to about 10 mol. % of the polymer. It should also be understood that various other monomeric repeating units may be incorporated into the polymer. For instance, in certain embodiments, the polymer may contain one or more repeating units derived from non-aromatic monomers, such as aliphatic or cycloaliphatic hydroxycarboxylic acids, dicarboxylic acids, diols, amides, amines, etc. Of course, in other embodiments, the polymer may be "wholly aromatic" in that it lacks repeating units derived from non-aromatic (e.g., aliphatic or cycloaliphatic) monomers.

Although not necessarily required, the liquid crystalline polymer may be a "high naphthenic" polymer to the extent that it contains a relatively high content of repeating units derived from naphthenic hydroxycarboxylic acids and naphthenic dicarboxylic acids, such as naphthalene-2,6-dicarboxylic acid ("NDA"), 6-hydroxy-2-naphthoic acid ("HNA"), or combinations thereof. That is, the total amount of repeating units derived from naphthenic hydroxycarboxylic and/or dicarboxylic acids (e.g., NDA, HNA, or a combination of HNA and NDA) may be about 10 mol. % or more, in some embodiments about 12 mol. % or more, in some embodiments about 15 mol. % or more, in some embodiments about 18 mol. % or more, in some embodiments about 30 mol. % or more, in some embodiments about 40 mol. % or more, in some embodiments about 45 mol. % or more, in some embodiments about 50 mol. % or more, in some embodiments about 60 mol. % or more, in some embodiments about 62 mol. % or more, in some embodiments about 68 mol. % or more, in some embodiments about 70 mol. % or more, and in some embodiments, from about 70 mol. % to about 80 mol. % of the polymer. Without intending to be limited by theory, it is believed that such "high naphthenic" polymers are capable of reducing the tendency of the polymer composition to absorb water, which can help stabilize the dielectric constant and dissipation factor at high frequency ranges. Namely, such high naphthenic polymers typically have a water adsorption of about 0.015% or less, in some embodiments about 0.01% or less, and in some embodiments, from about 0.0001% to about 0.008% after being immersed in water for 24 hours in accordance with ISO 62-1:2008. The high naphthenic polymers may also have a moisture adsorption of about 0.01% or less, in some embodiments about 0.008% or less, and in some embodiments, from about 0.0001% to about 0.006% after being exposed to a humid atmosphere (50% relative humidity) at a temperature of 23° C. in accordance with ISO 62-4:2008.

In one embodiment, for instance, the repeating units derived from HNA may constitute 30 mol. % or more, in some embodiments about 40 mol. % or more, in some embodiments about 45 mol. % or more, in some embodiments 50 mol. % or more, in some embodiments about 60 mol. % or more, in some embodiments about 62 mol. % or more, in some embodiments about 68 mol. % or more, in some embodiments about 70 mol. % or more, and in some embodiments, from about 70 mol. % to about 80 mol. % of the polymer. The liquid crystalline polymer may also contain various other monomers. For example, the polymer may contain repeating units derived from HBA in an amount of from about 10 mol. % to about 40 mol. %, and in some embodiments from about 15 mol. % to about 35 mol. %, and in some embodiments, from about 20 mol. % to about 30 mol. %. When employed, the molar ratio of HNA to HBA may be selectively controlled within a specific range to help achieve the desired properties, such as from about 0.1 to about 40, in some embodiments from about 0.5 to about 20, in some embodiments from about 0.8 to about 10, and in some embodiments, from about 1 to about 5. The polymer may also contain aromatic dicarboxylic acid(s) (e.g., IA and/or TA) in an amount of from about 1 mol. % to about 40 mol. %, and in some embodiments, from about 5 mol. % to about 25 mol. %; and/or aromatic diol(s) (e.g., BP and/or HQ) in an amount of from about 1 mol. % to about 40 mol. %, and in some embodiments, from about 5 mol. % to about 25 mol. %. In some cases, however, it may be desired to minimize the presence of such monomers in the polymer to help achieve the desired properties. For example, the total amount of aromatic dicarboxylic acid(s) (e.g., IA and/or TA) may be about 20 mol % or less, in some embodiments about 15 mol. % or less, in some embodiments about 10 mol. % or less, in some embodiments, from 0 mol. % to about 5 mol. %, and in some embodiments, from 0 mol. % to about 2 mol. % of the polymer. Similarly, the total amount of aromatic dicarboxylic acid(s) (e.g., IA and/or TA) may be about 20 mol % or less, in some embodiments about 15 mol. % or less, in some embodiments about 10 mol. % or less, in some embodiments, from 0 mol. % to about 5 mol. %, and in some embodiments, from 0 mol. % to about 2 mol. % of the polymer (e.g., 0 mol. %).

In another embodiment, the repeating units derived from NDA may constitute 10 mol. % or more, in some embodiments about 12 mol. % or more, in some embodiments about 15 mol. % or more, and in some embodiments, from about 18 mol. % to about 95 mol. % of the polymer. In such embodiments, the liquid crystalline polymer may also contain various other monomers, such as aromatic hydroxycarboxylic acid(s) (e.g., HBA) in an amount of from about 20 mol. % to about 60 mol. %, and in some embodiments, from about 30 mol. % to about 50 mol. %; aromatic dicarboxylic acid(s) (e.g., IA and/or TA) in an amount of from about 2 mol. % to about 30 mol. %, and in some embodiments, from about 5 mol. % to about 25 mol. %; and/or aromatic diol(s) (e.g., BP and/or HQ) in an amount of from about 2 mol. % to about 40 mol. %, and in some embodiments, from about 5 mol. % to about 35 mol. %.

Also, although not necessarily required, the liquid crystalline polymer may be a "low naphthenic" polymer to the extent that it contains a minimal content of repeating units derived from naphthenic hydroxycarboxylic acids and naphthenic dicarboxylic acids, such as naphthalene-2,6-dicarboxylic acid ("NDA"), 6-hydroxy-2-naphthoic acid ("HNA"), or combinations thereof. That is, the total amount of repeating units derived from naphthenic hydroxycarboxylic and/or dicarboxylic acids (e.g., NDA, HNA, or a combination of HNA and NDA) is typically no more than 10 mol. %, in some embodiments no more than about 15 mol. %, in some embodiments no more than about 8 mol. %, in some embodiments no more than about 6 mol. %, and in some embodiments from 1 mol. % to about 5 mol. % of the polymer (e.g., 0 mol. %). In one particular embodiment, the liquid crystalline polymer may be formed from repeating units derived from 4-hydroxybenzoic acid ("HBA") and terephthalic acid ("TA") and/or isophthalic acid ("IA"), as well as various other optional constituents. The repeating units derived from 4-hydroxybenzoic acid ("HBA") may constitute from about 10 mol. % to about 80 mol. %, in some embodiments from about 30 mol. % to about 75 mol. %, and in some embodiments from about 45 mol. % to about 70 mol. % of the polymer. The repeating units derived from terephthalic acid ("TA") and/or isophthalic acid ("IA") may likewise constitute from about 5 mol. % to about 40 mol. %, in some embodiments from about 10 mol. % to about 35 mol. %, and in some embodiments from about 15 mol. % to about 35 mol. % of the polymer. Repeating units may also be employed that are derived from 4,4'-biphenol ("BP") and/or hydroquinone ("HQ") in an amount from about 1 mol. % to about 30 mol. %, in some embodiments from about 2 mol. % to about 25 mol. %, and in some embodiments from about 5 mol. % to about 20 mol. % of the polymer. Other possible repeating units may include those derived from 6-hydroxy-2-naphthoic acid ("HNA"), 2,6-naphthalenedicarboxylic acid ("NDA"), and/or acetaminophen ("APAP"). In certain embodiments, for example, repeating units derived from HNA, NDA, and/or APAP may each constitute from about 1 mol. % to about 35 mol. %, in some embodiments from about 2 mol. % to about 30 mol. %, and in some embodiments from about 3 mol. % to about 25 mol. % when employed.

In certain embodiments, all of the liquid crystalline polymers employed in the polymer composition are "high naphthenic" polymers such as described above. In other embodiments, however, "low naphthenic" liquid crystalline polymers may also be employed in the composition in which the total amount of repeating units derived from naphthenic hydroxycarboxylic and/or dicarboxylic acids (e.g., NDA, HNA, or a combination of HNA and NDA) is less than 10 mol. %, in some embodiments about 8 mol. % or less, in some embodiments about 6 mol. % or less, and in some embodiments, from about 1 mol. % to about 5 mol. % of the polymer. When employed, it is generally desired that such low naphthenic polymers are present in only a relatively low amount. For example, when employed, low naphthenic liquid crystalline polymers typically constitute from about 1 wt. % to about 50 wt. %, in some embodiments from about 2 wt. % to about 40 wt. %, and in some embodiments, from about 5 wt. % to about 30 wt. % of the total amount of liquid crystalline polymers in the composition, and from about 0.5 wt. % to about 45 wt. %, in some embodiments from about 2 wt. % to about 35 wt. %, and in some embodiments, from about 5 wt. % to about 25 wt. % of the entire composition. Conversely, high naphthenic liquid crystalline polymers typically constitute from about 50 wt. % to about 99 wt. %, in some embodiments from about 60 wt. % to about 98 wt. %, and in some embodiments, from about 70 wt. % to about 95 wt. % of the total amount of liquid crystalline polymers in the composition, and from about 55 wt. % to about 99.5 wt. %, in some embodiments from about 65 wt. % to about 98 wt. %, and in some embodiments, from about 75 wt. % to about 95 wt. % of the entire composition.

The polymers within the polymer matrix may be present in an amount of about 30 wt. % or more, in some embodiments about 40 wt. % or more, in some embodiments from about 40 wt. % to about 99.5 wt. %, in some embodiments from about 50 wt. % to about 95 wt. %, in some embodiments, from about 60 wt. % to about 90 wt. %, and in some embodiments, from about 60 wt. % to about 85 wt. % of the polymer composition.

B. Laser Activatable Additive

The polymer composition may be "laser activatable" in the sense that it contains an additive that can be activated by a laser direct structuring ("LDS") process. In such a process, the additive is exposed to a laser that causes the release of metals. The laser thus draws the pattern of conductive elements onto the part and leaves behind a roughened surface containing embedded metal particles. These particles act as nuclei for the crystal growth during a subsequent plating process (e.g., copper plating, gold plating, nickel plating, silver plating, zinc plating, tin plating, etc.).

The laser activatable additive generally includes spinel crystals, which may include two or more metal oxide cluster configurations within a definable crystal formation. For example, the overall crystal formation may have the following general formula:

$$AB_2O_4$$

wherein,

A is a metal cation having a valance of 2, such as cadmium, chromium, manganese, nickel, zinc, copper, cobalt, iron, magnesium, tin, titanium, etc., as well as combinations thereof; and B is a metal cation having a valance of 3, such as chromium, iron, aluminum, nickel, manganese, tin, etc., as well as combinations thereof.

Typically, A in the formula above provides the primary cation component of a first metal oxide cluster and B provides the primary cation component of a second metal oxide cluster. These oxide clusters may have the same or different structures. In one embodiment, for example, the first metal oxide cluster has a tetrahedral structure and the second metal oxide cluster has an octahedral cluster. Regardless, the clusters may together provide a singular identifiable crystal type structure having heightened susceptibility to electromagnetic radiation. Examples of suitable spinel crystals include, for instance, $MgAl_2O_4$, $ZnAl_2O_4$, $FeAl_2O_4$, $CuFe_2O_4$, $CuCr_2O_4$, $MnFe_2O_4$, $NiFe_2O_4$, $TiFe_2O_4$, $FeCr_2O_4$, $MgCr_2O_4$, etc. Copper chromium oxide ($CuCr_2O_4$) is particularly suitable for use in the present invention and is available from Shepherd Color Co. under the designation "Shepherd Black 1GM."

Laser activatable additives may constitute from about 0.1 wt. % to about 30 wt. %, in some embodiments from about 0.5 wt. % to about 20 wt. %, and in some embodiments, from about 1 wt. % to about 10 wt. % of the polymer composition.

C. Dielectric Material

To help achieve the desired dielectric properties, the polymer composition may also contain a dielectric material. The dielectric material is typically employed in an amount of from about 10 wt. % to about 70 wt. %, in some embodiments from about 20 wt. % to about 60 wt. %, and in some embodiments, from about 30 wt. % to about 50 wt. % of the composition. In certain embodiments, it may be desirable to selectively control the volume resistivity of the dielectric material so that it is generally semi-conductive in nature. For example, the dielectric material may have a volume resistivity of from about 0.1 ohm-cm to about $1\times10^{12}$ ohm-cm, in some embodiments about 0.5 ohm-cm to about $1\times10^{11}$ ohm-cm, in some embodiments from about 1 to about $1\times10^{10}$ ohm-cm, and in some embodiments, from about 2 to about $1\times10^{8}$ ohm-cm, such as determined at a temperature of about 20° C. in accordance with ASTM D257-14. This may be accomplished by selecting a single material having the desired volume resistivity, or by blending multiple materials together (e.g., insulative and electrically conductive) so that the resulting blend has the desired volume resistance.

In one embodiment, for example, inorganic oxide materials may be employed that may exhibit a linear response of electrical charge (or polarization) versus voltage. These materials may exhibit a total reversible polarization of charge within the crystal structure after the applied electrical field is removed. Suitable inorganic oxide materials for this purpose may include, for instance, ferroelectric and/or paraelectric materials. Examples of suitable ferroelectric materials include, for instance, barium titanate ($BaTiO_3$), strontium titanate ($SrTiO_3$), calcium titanate ($CaTiO_3$), magnesium titanate ($MgTiO_3$), strontium barium titanate ($SrBaTiO_3$), sodium barium niobate ($NaBa_2Nb_5O_{15}$), potassium barium niobate ($KBa_2Nb_5SO_{15}$), calcium zirconate ($CaZrO_3$), titanite ($CaTiSiO_5$), as well as combinations thereof. Examples of suitable paraelectric materials likewise include, for instance, titanium dioxide ($TiO_2$), tantalum pentoxide ($Ta_2O_5$), hafnium dioxide ($HfO_2$), niobium pentoxide ($Nb_2O_5$), alumina ($Al_2O_3$), zinc oxide (ZnO), etc., as well as combinations thereof. Particularly suitable inorganic oxide materials are particles that include $TiO_2$, $BaTiO_3$, $SrTiO_3$, $CaTiO_3$, $MgTiO_3$, $BaSrTi_2O_6$, and ZnO. Of course, other types of inorganic oxide materials (e.g., mica) may also be employed as a dielectric material. Carbon materials may likewise be employed, such as graphite, carbon black, etc.

The shape and size of the dielectric materials are not particularly limited and may include particles, fine powders, fibers, whiskers, tetrapod, plates, etc. In one embodiment, for instance, the dielectric material may include particles having an average diameter of from about 0.01 to about 100 micrometers, and in some embodiments, from about 0.10 to about 20 micrometers. In another embodiment, the dielectric material may include fibers and/or whiskers having an average diameter of from about 0.1 to about 35 micrometers, in some embodiments from about 0.2 to about 20 micrometers, and in some embodiments, from about 0.5 to about 15 micrometers. When employed, the whiskers may have an aspect ratio of from about 1 to about 100, in some embodiments from about 2 to about 80, and in some embodiments, from about 4 to about 50. The volume average length of such whiskers may, for example, range from about 1 to about 200 micrometers, in some embodiments from about 2 to about 150 micrometers, and in some embodiments, from about 5 to about 100 micrometers.

As indicated above, various techniques may be employed to help achieve the desired volume resistivity. In one embodiment, for instance, an inorganic oxide material may be employed that has a volume resistivity of from 0.1 ohm-cm to about 500 ohm-cm, in some embodiments about 0.5 ohm-cm to about 250 ohm-cm, in some embodiments from about 1 to about 100 ohm-cm, and in some embodiments, from about 2 to about 50 ohm-cm, such as determined at a temperature of about 20° C. in accordance with ASTM D257-14. One example of such a material includes inorganic oxide whiskers (e.g., zinc oxide whiskers) having a three-dimensional structure. For instance, the inorganic oxide whiskers may have a central body and a plurality of needle crystals extending radially therefrom to form the three-dimensional structure. When such whiskers are compounded into a resin, the needle crystals may be brought into very close contact with each other, thereby increasing the probability of forming a stable electrically conducting path. The number of needle crystals may vary, such as about 2 or more, in some embodiments from 3 to 8, and in some embodiments, from 4 to 6 (e.g., 4). When 4 needle crystals are present, for instance, the whiskers have a "tetrapod" form even though one or more of these needle crystal projections may be broken during processing and/or manufacturing. The central body and/or basal portion of the needle crystals may have an average diameter within the ranges noted above, such as from about 0.1 to about 35 micrometers, in some embodiments from about 0.2 to about 20 micrometers, and in some embodiments, from about 0.5 to about 15 micrometers. The volume average length of the need crystals (basal to tip) may likewise have a volume average length within the ranges noted above, such as from about 1 to about 200 micrometers, in some embodiments from about 2 to about 150 micrometers, and in some embodiments, from about 5 to about 100 micrometers. Such whiskers may be formed by thermally treating a metal powder (e.g., zinc) having an oxide film on the surface in an atmosphere containing molecular oxygen, such as described in U.S. Pat. No. 4,960,654 to Yoshinaka, et al. One particularly suitable type of whiskers having such characteristics include single-crystal, tetrapod zinc oxide whiskers available from Panasonic under the trade name Pana-Tetra™.

In another embodiment, a carbon material may be employed that has a volume resistivity of from about $1\times10^3$ to about $1\times10^{12}$ ohm-cm, in some embodiments about $1\times10^4$ to about $1\times10^{11}$ ohm-cm, in some embodiments from about $1\times10^5$ to about $1\times10^{10}$ ohm-cm, and in some embodiments, from about $1\times10^6$ to about $1\times10^8$ ohm-cm, such as determined at a temperature of about 20° C. in accordance with ASTM D257-14. For instance, a carbon material (e.g., particles, fibers, etc.) having a volume resistivity within the ranges noted above may be obtained by calcining an organic substance (e.g., petroleum tar, petroleum pitch, coal tar or coal pitch) at a high temperature (e.g., 400° to 900° C.) in an inert atmosphere, such as described in U.S. Pat. No. 8,642,682 to Nishihata, et al. The resulting carbon material typically has a high carbon content, such as about 80 wt. % or more, in some embodiments about 85 wt. % or more, and in some embodiments, from about 90 wt. % to about 98 wt. %. One particularly suitable type of carbon material having such characteristics is available from Kureha Extron under the trade name Krefine™.

Of course, as noted above, electrically conductive materials may also be employed in combination with an insulative material to help achieve the desired volume resistance. The electrically conductive materials generally have a volume resistivity of less than about 0.1 ohm-cm, and in some embodiments, from about $1\times10^{-8}$ to about $1\times10^{-2}$ ohm-cm, and the insulative materials generally have a volume resistivity of greater than about $1\times10^{12}$ ohm-cm, and in some embodiments, from about $1\times10^{13}$ to about $1\times10^{18}$ ohm-cm. Suitable electrically conductive materials may include, for instance, electrically conductive carbon materials (e.g., graphite, carbon black, fibers, graphene, nanotubes, etc.), metals, etc. Suitable insulative materials may likewise include inorganic oxide materials (e.g., particles) as described above, such as titanium dioxide ($TiO_2$). When employed, the ratio of the weight percentage of the insulative material in the polymer composition to the weight percentage of the electrically conductive material in the composition may be from about 3 to about 20, in some embodiments from about 7 to about 18, and in some embodiments, from about 8 to about 15. For example, the electrically conductive material may constitute from about 1 wt. % to about 20 wt. %, in some embodiments from about 3 wt. % to about 18 wt. %, and in some embodiments, from about 5 wt. % to about 15 wt. % of the dielectric material, while the insulative material may constitute from about 80 wt. % to about 99 wt. %, in some embodiments 82 wt. % to about 97 wt. %, and in some embodiments, from about 85 wt. % to about 95 wt. % of the dielectric material. Likewise, the electrically conductive material may constitute from about 0.1 wt. % to about 15 wt. %, in some embodiments from about 0.5 wt. % to about 12 wt. %, and in some embodiments, from about 1 wt. % to about 10 wt. % of the polymer composition, while the insulative material may constitute from about 20 wt. % to about 60 wt. %, in some embodiments 25 wt. % to about 55 wt. %, and in some embodiments, from about 30 wt. % to about 50 wt. % of the polymer composition.

D. Fibrous Filler

A fibrous filler may also be employed in the polymer composition to improve the thermal and mechanical properties of the polymer composition without having a significant impact on electrical performance. Unlike the hollow inorganic fillers mentioned above, these fibrous fillers may be non-hollow (or solid) fibrous fillers. The fibrous filler typically includes fibers having a high degree of tensile strength relative to their mass. For example, the ultimate tensile strength of the fibers (determined in accordance with ASTM D2101) is typically from about 1,000 to about 15,000 Megapascals ("MPa"), in some embodiments from about 2,000 MPa to about 10,000 MPa, and in some embodiments from about 3,000 MPa to about 6,000 MPa. To help maintain the desired dielectric properties, such high strength fibers may be formed from materials that are generally insulative in nature, such as glass, ceramics or minerals (e.g., alumina or silica), aramids (e.g., Kevler® marketed by E. I. duPont de Nemours, Wilmington, Del.), minerals, polyolefins, polyesters, etc.

In one embodiment, the fibrous filler may include glass fibers, mineral fibers, or a mixture thereof. For instance, in one embodiment, the fibrous filler may include glass fibers. The glass fibers particularly suitable may include E-glass, A-glass, C-glass, D-glass, AR-glass, R-glass, S1-glass, S2-glass, etc. In another embodiment, the fibrous filler may include mineral fibers. The mineral fibers may include those derived from silicates, such as neosilicates, sorosilicates, inosilicates (e.g., calcium inosilicates, such as wollastonite; calcium magnesium inosilicates, such as tremolite; calcium magnesium iron inosilicates, such as actinolite; magnesium iron inosilicates, such as anthophyllite; etc.), phyllosilicates (e.g., aluminum phyllosilicates, such as palygorskite), tectosilicates, etc.; sulfates, such as calcium sulfates (e.g., dehydrated or anhydrous gypsum); mineral wools (e.g., rock or slag wool); and so forth. Particularly suitable are inosilicates, such as wollastonite fibers available from Nyco Minerals under the trade designation NYGLOS® (e.g., NYGLOS® 4W or NYGLOS® 8).

Further, although the fibrous fillers may have a variety of different sizes, fibers having a certain aspect ratio can help improve the mechanical properties of the polymer composition. That is, fibrous fillers having an aspect ratio (average length divided by nominal diameter) of about 2 or more, in some embodiments about 4 or more, in some embodiments from about 5 to about 50, and in some embodiments from about 8 to about 40 may be particularly beneficial. Such fibrous fillers may, for instance, have a weight average length of about 10 micrometer or more, in some embodiments about 25 micrometers or more, in some embodiments from about 50 micrometers or more to about 800 micrometers or less, and in some embodiments from about 60 micrometers to about 500 micrometers. Also, such fibrous fillers may, for instance, have a volume average length of about 10 micrometer or more, in some embodiments about 25 micrometers or more, in some embodiments from about 50 micrometers or more to about 800 micrometers or less, and in some embodiments from about 60 micrometers to about 500 micrometers.

The fibrous fillers may likewise have a nominal diameter of about 5 micrometers or more, in some embodiments about 6 micrometers or more, in some embodiments from about 8 micrometers to about 40 micrometers, and in some embodiments from about 9 micrometers to about 20 micrometers. The relative amount of the fibrous filler may also be selectively controlled to help achieve the desired mechanical and thermal properties without adversely impacting other properties of the polymer composition, such as its flowability and dielectric properties, etc. In this regard, the fibrous fillers may have a dielectric constant of about 6 or less, in some embodiments about 5.5 or less, in some embodiments from about 1.1 to about 5, and in some embodiments from about 2 to about 4.8 at a frequency of 1 GHz.

The fibrous filler may be in a modified or an unmodified form, e.g., provided with a sizing, or chemically treated, in order to improve adhesion to the plastic. In some examples, glass fibers may be provided with a sizing to protect the glass fiber, to smooth the fiber but also to improve the adhesion between the fiber and a matrix material. If present, a sizing may comprise silanes, film forming agents, lubricants, wetting agents, adhesive agents optionally antistatic agents and plasticizers, emulsifiers and optionally further additives. In one particular embodiment, the sizing may include a silane. Specific examples of silanes are aminosilanes, e.g. 3-trimethoxysilylpropylamine, N-(2-aminoethyl)-3-aminopropyltrimethoxy-silane, N-(3-trimethoxysilanyl-propyl)ethane-1,2-diamine, 3-(2-aminoethyl-amino)propyltrimethoxysilane, N-[3-(trimethoxysilyl)propyl]-1,2-ethane-diamine.

The fibrous filler may, for instance, constitute from about 1 wt. % to about 40 wt. %, in some embodiments from about 3 wt. % to about 30 wt. %, and in some embodiments, from about 5 wt. % to about 20 wt. % of the polymer composition.

The relative amount of the fibrous filler may also be selectively controlled to help achieve the desired mechanical and thermal properties without adversely impacting other properties of the polymer composition, such as its flowability and dielectric properties, etc. For example, the fibrous filler may be employed in a sufficient amount so that the weight ratio of the fibrous filler to the combined amounts of the dielectric and laser activatable materials is from about 0.05 to about 1, in some embodiments from about 0.05 to about 0.5, in some embodiments from about 0.06 to about 0.4, and in some embodiments from about 0.1 to about 0.3.

E. Hydrophobic Material

If desired, an optional hydrophobic material may also be employed in the polymer composition that is distributed throughout the polymer matrix. Without intending to be limited by theory, it is believed that the hydrophobic material can help reduce the tendency of the polymer composition to absorb water, which can help stabilize the dielectric constant and dissipation factor at high frequency ranges. The weight ratio of polymer(s) to hydrophobic material(s) is typically from about 1 to about 20, in some embodiments from about 2 to about 15, and in some embodiments, from about 3 to about 10. For example, the hydrophobic material may constitute from about 1 wt. % to about 60 wt. %, in some embodiments from about 2 wt. % to about 50 wt. %, and in some embodiments, from about 5 wt. % to about 40 wt. % of the entire polymer composition.

Particularly suitable hydrophobic materials are low surface energy elastomers, such as fluoropolymers, silicone polymers, etc. Fluoropolymers, for instance, may contains a hydrocarbon backbone polymer in which some or all of the hydrogen atoms are substituted with fluorine atoms. The backbone polymer may be polyolefinic and formed from fluorine-substituted, unsaturated olefin monomers. The fluoropolymer can be a homopolymer of such fluorine-substituted monomers or a copolymer of fluorine-substituted monomers or mixtures of fluorine-substituted monomers and non-fluorine-substituted monomers. Along with fluorine atoms, the fluoropolymer can also be substituted with other halogen atoms, such as chlorine and bromine atoms. Representative monomers suitable for forming fluoropolymers for use in this invention are tetrafluoroethylene ("TFE"), vinylidene fluoride ("VF2"), hexafluoropropylene ("HFP"), chlorotrifluoroethylene ("CTFE"), perfluoroethylvinyl ether ("PEVE"), perfluoromethylvinyl ether ("PMVE"), perfluoropropylvinyl ether ("PPVE"), etc., as well as mixtures thereof. Specific examples of suitable fluoropolymers include polytetrafluoroethylene ("PTFE"), perfluoroalkylvinyl ether ("PVE"), poly(tetrafluoroethylene-co-perfluoroalkyvinyl ether) ("PFA"), fluorinated ethylene-propylene copolymer ("FEP"), ethylene-tetrafluoroethylene copolymer ("ETFE"), polyvinylidene fluoride ("PVDF"), polychlorotrifluoroethylene ("PCTFE"), and TFE copolymers with VF2 and/or HFP, etc., as well as mixtures thereof.

In certain embodiments, the hydrophobic material (e.g., fluoropolymer) may have a particle size that is selectively controlled to help form films of a relatively low thickness. For example, the hydrophobic material may have a median particle size (e.g., diameter) of about 1 to about 60 micrometers, in some embodiments from about 2 to about 55 micrometers, in some embodiments from about 3 to about 50 micrometers, and in some embodiments, from about 25 to about 50 micrometers, such as determined using laser diffraction techniques in accordance with ISO 13320:2009 (e.g., with a Horiba LA-960 particle size distribution analyzer). The hydrophobic material may also have a narrow size distribution. That is, at least about 70% by volume of the particles, in some embodiments at least about 80% by volume of the particles, and in some embodiments, at least about 90% by volume of the particles may have a size within the ranges noted above.

F. Particulate Filler

If desired, a particulate filler may be employed for improving certain properties of the polymer composition. The particulate filler may be employed in the polymer composition in an amount of from about 5 to about 60 parts, in some embodiments from about 10 to about 50 parts, and in some embodiments, from about 15 to about 40 parts by weight per 100 parts of the liquid crystalline polymer(s) employed in the polymer composition. For instance, the particulate filler may constitute from about 5 wt. % to about 50 wt. %, in some embodiments from about 10 wt. % to about 40 wt. %, and in some embodiments, from about 15 wt. % to about 30 wt. % of the polymer composition.

In certain embodiments, particles may be employed that have a certain hardness value to help improve the surface properties of the composition. For instance, the hardness values may be about 2 or more, in some embodiments about 2.5 or more, in some embodiments from about 3 to about 11, in some embodiments from about 3.5 to about 11, and in some embodiments, from about 4.5 to about 6.5 based on the Mohs hardness scale. Examples of such particles may include, for instance, silica (Mohs hardness of 7), mica (e.g., Mohs hardness of about 3); carbonates, such as calcium carbonate ($CaCO_3$, Mohs hardness of 3.0) or a copper carbonate hydroxide ($Cu_2CO_3(OH)_2$, Mohs hardness of 4.0); fluorides, such as calcium fluoride ($CaFl_2$, Mohs hardness of 4.0); phosphates, such as calcium pyrophosphate (($Ca_2P_2O_7$, Mohs hardness of 5.0), anhydrous dicalcium phosphate ($CaHPO_4$, Mohs hardness of 3.5), or hydrated aluminum phosphate ($AlPO_4.2H_2O$, Mohs hardness of 4.5); borates, such as calcium borosilicate hydroxide ($Ca_2B_5SiO_9(OH)_5$, Mohs hardness of 3.5); alumina ($AlO_2$, Mohs hardness of 10.0); sulfates, such as calcium sulfate ($CaSO_4$, Mohs hardness of 3.5) or barium sulfate ($BaSO_4$, Mohs hardness of from 3 to 3.5); and so forth, as well as combinations thereof.

The shape of the particles may vary as desired. For instance, flake-shaped particles may be employed in certain embodiments that have a relatively high aspect ratio (e.g., average diameter divided by average thickness), such as about 10:1 or more, in some embodiments about 20:1 or more, and in some embodiments, from about 40:1 to about 200:1. The average diameter of the particles may, for example, range from about 5 micrometers to about 200 micrometers, in some embodiments from about 30 micrometers to about 150 micrometers, and in some embodiments, from about 50 micrometers to about 120 micrometers, such as determined using laser diffraction techniques in accordance with ISO 13320:2009 (e.g., with a Horiba LA-960 particle size distribution analyzer). Suitable flaked-shaped particles may be formed from a natural and/or synthetic silicate mineral, such as mica, halloysite, kaolinite, illite, montmorillonite, vermiculite, palygorskite, pyrophyllite, calcium silicate, aluminum silicate, wollastonite, etc. Mica, for instance, is particularly suitable. Any form of mica may generally be employed, including, for instance, muscovite ($KAl_2(AlSi_3)O_{10}(OH)_2$), biotite ($K(Mg,Fe)_3(AlSi_3)O_{10}(OH)_2$), phlogopite ($KMg_3(AlSi_3)O_{10}(OH)_2$), lepidolite ($K(Li,Al)_{2-3}(AlSi_3)O_{10}(OH)_2$), glauconite ($K,Na)(Al,Mg,Fe)_2(Si,Al)_4O_{10}(OH)_2$), etc. Granular particles may also be employed. Typically, such particles have an average diameter of from about 0.1 to about 10 micrometers, in some embodiments from about 0.2 to about 4 micrometers, and in some embodiments, from about 0.5 to about 2 micrometers, such as determined using laser diffraction techniques in accordance with ISO 13320:2009 (e.g., with a Horiba LA-960 particle size distribution analyzer). Particularly suitable granular fillers may include, for instance, talc, barium sulfate, calcium sulfate, calcium carbonate, etc.

The particulate filler may be formed primarily or entirely from one type of particle, such as flake-shaped particles (e.g., mica) or granular particles (e.g., barium sulfate). That is, such flaked-shaped or granular particles may constitute about 50 wt. % or more, and in some embodiments, about 75 wt. % or more (e.g., 100 wt. %) of the particulate filler. Of course, in other embodiments, flake-shaped and granular particles may also be employed in combination. In such embodiments, for example, flake-shaped particles may constitute from about 0.5 wt. % to about 20 wt. %, and in some embodiments, from about 1 wt. % to about 10 wt. % of the particulate filler, while the granular particles constitute from about 80 wt. % to about 99.5 wt. %, and in some embodiments, from about 90 wt. % to about 99 wt. % of the particulate filler.

If desired, the particles may also be coated with a fluorinated additive to help improve the processing of the composition, such as by providing better mold filling, internal lubrication, mold release, etc. The fluorinated additive may include a fluoropolymer, which contains a hydrocarbon backbone polymer in which some or all of the hydrogen atoms are substituted with fluorine atoms. The backbone polymer may be polyolefinic and formed from fluorine-substituted, unsaturated olefin monomers. The fluoropolymer can be a homopolymer of such fluorine-substituted monomers or a copolymer of fluorine-substituted monomers or mixtures of fluorine-substituted monomers and non-fluorine-substituted monomers. Along with fluorine atoms, the fluoropolymer can also be substituted with other halogen atoms, such as chlorine and bromine atoms. Representative monomers suitable for forming fluoropolymers for use in this invention are tetrafluoroethylene, vinylidene fluoride, hexafluoropropylene, chlorotrifluoroethylene, perfluoroethylvinyl ether, perfluoromethylvinyl ether, perfluoropropylvinyl ether, etc., as well as mixtures thereof. Specific examples of suitable fluoropolymers include polytetrafluoroethylene, perfluoroalkylvinyl ether, poly(tetrafluoroethylene-co-perfluoroalkyvinylether), fluorinated ethylene-propylene copolymer, ethylene-tetrafluoroethylene copolymer, polyvinylidene fluoride, polychlorotrifluoroethylene, etc., as well as mixtures thereof.

G. Other Additives

A wide variety of additional additives can also be included in the polymer composition, such as hollow fillers, lubricants, thermally conductive fillers, pigments, antioxidants, stabilizers, surfactants, waxes, flame retardants, anti-drip additives, nucleating agents (e.g., boron nitride), flow modifiers (e.g., alumina trihydrate), coupling agents, antimicrobials, pigments or other colorants, impact modifiers, and other materials added to enhance properties and processability. Such optional materials may be employed in polymer composition in conventional amounts and according to conventional processing techniques. When employed, for example, lubricants and/or flow modifiers may constitute from about 0.05 wt. % to about 5 wt. %, and in some embodiments from about 0.1 wt. % to about 1 wt. % of the polymer composition.

Although by no means required, the polymer composition may also include one or more hollow inorganic fillers to help achieve the desired dielectric constant. For instance, such fillers may have a dielectric constant of about 3.0 or less, in some embodiments about 2.5 or less, in some embodiments from about 1.1 to about 2.3, and in some embodiments from about 1.2 to about 2.0 at 100 MHz. The hollow inorganic fillers typically have an interior hollow space or cavity and may be synthesized using techniques known in the art. The hollow inorganic fillers may be made from conventional materials. For instance, the hollow inorganic fillers may include alumina, silica, zirconia, magnesia, glass, fly ash, borate, phosphate, ceramic, and the like. In one embodiment, the hollow inorganic fillers may include hollow glass fillers, hollow ceramic fillers, and mixtures thereof. In one embodiment, the hollow inorganic fillers include hollow glass fillers. The hollow glass fillers may be made from a soda lime borosilicate glass, a soda lime glass, a borosilicate glass, a sodium borosilicate glass, a sodium silicate glass, or an aluminosilicate glass. In this regard, in one embodiment, the composition of the glass, while not limited, may be at least about 65% by weight of $SiO_2$, 3-15% by weight of $Na_2O$, 8-15% by weight of CaO, 0.1-5% by weight of MgO, 0.01-3% by weight of $Al_2O_3$, 0.01-1% by weight of $K_2O$, and optionally other oxides (e.g., $Li_2O$, $Fe_2O_3$, $TiO_2$, $B_2O_3$). In another embodiment, the composition may be about 50-58% by weight of $SiO_2$, 25-30% by weight of $Al_2O_3$, 6-10% by weight of CaO, 1-4% by weight of $Na_2O/K_2O$, and 1-5% by weight of other oxides. Also, in one embodiment, the hollow glass fillers may include more alkaline earth metal oxides than alkali metal oxides. For example, the weight ratio of the alkaline earth metal oxides to the alkali metal oxides may be more than 1, in some embodiments about 1.1 or more, in some embodiments about 1.2 to about 4, and in some embodiments from about 1.5 to about 3. Regardless of the above, it should be understood that the glass composition may vary depending on the type of glass utilized and still provide the benefits as desired by the present invention.

The hollow inorganic fillers may have at least one dimension having an average value that is about 1 micrometers or more, in some embodiments about 5 micrometers or more, in some embodiments about 8 micrometers or more, in some embodiments from about 1 micrometer to about 150 micrometers, in some embodiments from about 10 micrometers to about 150 micrometers, and in some embodiments from about 12 micrometers to about 50 micrometers. In one embodiment, such average value may refer to a $d_{50}$ value. Furthermore, the hollow inorganic fillers may have a $D_{10}$ of about 3 micrometers or more, in some embodiments about 4 micrometers or more, in some embodiments from about 5 micrometers to about 20 micrometers, and in some embodiments from about 6 micrometers to about 15 micrometers. The hollow inorganic fillers may have a $D_{90}$ of about 10 micrometers or more, in some embodiments about 15 micrometers or more, in some embodiments from about 20 micrometers to about 150 micrometers, and in some embodiments from about 22 micrometers to about 50 micrometers. In this regard, the hollow inorganic fillers may be present in a size distribution, which may be a Gaussian, normal, or non-normal size distribution. In one embodiment, the hollow inorganic fillers may have a Gaussian size distribution. In another embodiment, the hollow inorganic fillers may have a normal size distribution. In a further embodiment, the hollow inorganic fillers may have a non-normal size distribution. Examples of non-normal size distributions may include unimodal and multi-modal (e.g., bimodal) size distributions. When referring to dimensions above, such dimension may be any dimension. In one embodiment, however, such dimension refers to a diameter. For example, such value for the dimension refers to an average diameter of spheres. The dimension, such as the average diameter, may be determined in accordance to 3M QCM 193.0. In this regard, in one embodiment, the hollow inorganic fillers may be referring to hollow spheres such as hollow glass spheres. For instance, the hollow inorganic fillers may have an average aspect ratio of approximately 1. In general, the average aspect ratio may be about 0.8 or more, in some embodiments about 0.85 or more, in some embodiments from about 0.9 to about 1.3, and in some embodiments from about 0.95 to about 1.05.

In addition, the hollow inorganic fillers may have relatively thin walls to help with the dielectric properties of the polymer composition as well as the reduction in weight. The thickness of the wall may be about 50% or less, in some embodiments about 40% or less, in some embodiments from about 1% to about 30%, and in some embodiments from about 2% to about 25% the average dimension, such as the average diameter, of the hollow inorganic fillers. In addition, the hollow inorganic fillers may have a certain true density that can allow for easy handling and provide a polymer composition having a reduction in weight. In general, the true density refers to the quotient obtained by dividing the mass of a sample of the hollow fillers by the true volume of that mass of hollow fillers wherein the true volume is referred to as the aggregate total volume of the hollow fillers. In this regard, the true density of the hollow inorganic fillers may be about 0.1 $g/cm^3$ or more, in some embodiments about 0.2 $g/cm^3$ or more, in some embodiments from about 0.3 $g/cm^3$ or more to about 1.2 $g/cm^3$, and in some embodiments from about 0.4 $g/cm^3$ or more to about 0.9 $g/cm^3$. The true density may be determined in accordance to 3M QCM 14.24.1.

Even though the fillers are bub, they may have a mechanical strength that allows for maintaining the integrity of the structure of the fillers resulting in a lower likelihood of the fillers being broken during processing and/or use. In this regard, the isotactic crush resistance (i.e., wherein at least 80 vol. %, such as at least 90 vol. % of the hollow fillers survive) of the hollow inorganic fillers may be about 20 MPa or more, in some embodiments about 100 MPa or more, in some embodiments from about 150 MPa to about 500 MPa, and in some embodiments from about 200 MPa to about 350 MPa. The isotactic crush resistance may be determined in accordance to 3M QCM 14.1.8.

The alkalinity of the hollow inorganic fillers may be about 1.0 meq/g or less, in some embodiments about 0.9 meq/g or less, in some embodiments from about 0.1 meq/g to about 0.8 meq/g, and in some embodiments from about 0.2 meq/g to about 0.7 meq/g. The alkalinity may be determined in accordance to 3M QCM 55.19. In order to provide a relatively low alkalinity, the hollow inorganic fillers may be treated with a suitable acid, such as a phosphoric acid. In addition, the hollow inorganic fillers may also include a surface treatment to assist with providing a better compatibility with the polymer and/or other components within the polymer composition. As an example, the surface treatment may be a silanization. In particular, the surface treatment agents may include, but are not limited to, aminosilanes, epoxysilanes, etc.

When employed, the hollow inorganic fillers may, for instance, constitute about 1 wt. % or more, in some embodiments about 4 wt. % or more, in some embodiments from about 5 wt. % to about 40 wt. %, and in some embodiments from about 10 wt. % to about 30 wt. % of the polymer composition.

II. Formation

The components used to form the polymer composition may be combined together using any of a variety of different techniques as is known in the art. In one particular embodiment, for example, the polymer, laser activatable additive, and other optional additives are melt processed as a mixture within an extruder to form the polymer composition. The mixture may be melt-kneaded in a single-screw or multi-screw extruder at a temperature of from about 250° C. to about 450° C. In one embodiment, the mixture may be melt processed in an extruder that includes multiple temperature zones. The temperature of individual zones is typically set within about −60° C. to about 25° C. relative to the melting temperature of the polymer. By way of example, the mixture may be melt processed using a twin screw extruder such as a Leistritz 18-mm co-rotating fully intermeshing twin screw extruder. A general purpose screw design can be used to melt process the mixture. In one embodiment, the mixture including all of the components may be fed to the feed throat in the first barrel by means of a volumetric feeder. In another embodiment, different components may be added at different addition points in the extruder, as is known. For example, the polymer may be applied at the feed throat, and certain additives (e.g., laser activatable additive and/or other additives) may be supplied at the same or different temperature zone located downstream therefrom. Regardless, the resulting mixture can be melted and mixed then extruded through a die. The extruded polymer composition can then be quenched in a water bath to solidify and granulated in a pelletizer followed by drying.

The melt viscosity of the polymer composition is generally low enough that it can readily flow into the cavity of a mold to form the small-sized circuit substrate. For example, in one particular embodiment, the polymer composition may have a melt viscosity of from about 5 Pa-s or more, in some embodiments about 10 Pa-s or more, in some embodiments from about 10 Pa-s to about 500 Pa-s, in some embodiments from about 5 Pa-s to about 150 Pa-s, in some embodiments from about 5 Pa-s to about 100 Pa-s, in some embodiments from about 10 Pa-s to about 100 Pa-s, in some embodiments from about 15 to about 90 Pa-s, as determined at a shear rate of 1,000 seconds$^{-1}$.

III. Substrate

Once formed, the polymer composition may be molded into the desired shape of a substrate. Typically, the substrate is molded using a one-component injection molding process in which dried and preheated plastic granules are injected into the mold. These substrates can be used in antenna systems and can be coupled to an antenna element.

As indicated above, conductive elements may then be formed on the substrate using a laser direct structuring process ("LDS"). Activation with a laser causes a physiochemical reaction in which the spinel crystals are cracked open to release metal atoms. These metal atoms can act as a nuclei for metallization (e.g., reductive copper coating). The laser also creates a microscopically irregular surface and ablates the polymer matrix, creating numerous microscopic pits and undercuts in which the copper can be anchored during metallization.

The present invention may be better understood with reference to the following examples.

Test Methods

Melt Viscosity: The melt viscosity (Pa-s) may be determined in accordance with ISO Test No. 11443:2005 at a shear rate of 1,000 s$^{-1}$ and temperature 15° C. above the melting temperature (e.g., about 350° C.) using a Dynisco LCR7001 capillary rheometer. The rheometer orifice (die) had a diameter of 1 mm, length of 20 mm, L/D ratio of 20.1, and an entrance angle of 180°. The diameter of the barrel was 9.55 mm+0.005 mm and the length of the rod was 233.4 mm.

Melting Temperature: The melting temperature ("Tm") may be determined by differential scanning calorimetry ("DSC") as is known in the art. The melting temperature is the differential scanning calorimetry (DSC) peak melt temperature as determined by ISO Test No. 11357-2:2013. Under the DSC procedure, samples were heated and cooled at 20° C. per minute as stated in ISO Standard 10350 using DSC measurements conducted on a TA Q2000 Instrument.

Deflection Temperature Under Load ("DTUL"): The deflection under load temperature may be determined in accordance with ISO Test No. 75-2:2013 (technically equivalent to ASTM D648-07). More particularly, a test strip sample having a length of 80 mm, thickness of 10 mm, and width of 4 mm may be subjected to an edgewise three-point bending test in which the specified load (maximum outer fibers stress) was 1.8 Megapascals. The specimen may be lowered into a silicone oil bath where the temperature is raised at 2° C. per minute until it deflects 0.25 mm (0.32 mm for ISO Test No. 75-2:2013).

Tensile Modulus, Tensile Stress, and Tensile Elongation: Tensile properties may be tested according to ISO Test No. 527:2012 (technically equivalent to ASTM D638-14). Modulus and strength measurements may be made on the same test strip sample having a length of 80 mm, thickness of 10 mm, and width of 4 mm. The testing temperature may be about 23° C., and the testing speeds may be 1 or 5 mm/min.

Flexural Modulus, Flexural Stress, and Flexural Elongation: Flexural properties may be tested according to ISO Test No. 178:2010 (technically equivalent to ASTM D790-10). This test may be performed on a 64 mm support span. Tests may be run on the center portions of uncut ISO 3167 multi-purpose bars. The testing temperature may be about 23° C. and the testing speed may be 2 mm/min.

Unnotched and Notched Charpy Impact Strength: Charpy properties may be tested according to ISO Test No. ISO 179-1:2010) (technically equivalent to ASTM D256-10, Method B). This test may be run using a Type 1 specimen size (length of 80 mm, width of 10 mm, and thickness of 4 mm). When testing the notched impact strength, the notch may be a Type A notch (0.25 mm base radius). Specimens may be cut from the center of a multi-purpose bar using a single tooth milling machine. The testing temperature may be about 23° C.

Dielectric Constant ("Dk") and Dissipation Factor ("Df"): The dielectric constant (or relative static permittivity) and dissipation factor are determined using a known split-post dielectric resonator technique, such as described in Baker-Jarvis, et al., *IEEE Trans. on Dielectric and Electrical Insulation*, 5(4), p. 571 (1998) and Krupka, et al., *Proc. 7$^{th}$ International Conference on Dielectric Materials: Measurements and Applications, IEEE Conference Publication No.* 430 (September 1996). More particularly, a plaque sample having a size of 80 mm×80 mm×1 mm was inserted between two fixed dielectric resonators. The resonator measured the permittivity component in the plane of the specimen. Five (5) samples are tested and the average value is recorded. The split-post resonator can be used to make dielectric measurements in the low gigahertz region, such as 1, 2, or 10 GHz.

Heat Cycle Test: Specimens are placed in a temperature control chamber and heated/cooled within a temperature range of from −30° C. and 100° C. Initially, the samples are heated until reaching a temperature of 100° C., when they were immediately cooled. When the temperature reaches −30° C., the specimens are immediately heated again until reaching 100° C. Twenty three (23) heating/cooling cycles may be performed over a 3-hour time period.

Example 1

Samples 1-5 are formed from various combinations of liquid crystalline polymers (LCP 1, LCP 2, LCP 3, or LCP 4), titanium dioxide, graphite, copper chromite filler (CuCr$_2$O$_4$), glass fibers, and alumina trihydrate. LCP 1 is formed from 48% HNA, 2% HBA, 25% BP, and 25% TA. LCP 2 is formed from 43% HBA, 20% NDA, 9% TA, and 28% HQ. LCP 3 is formed from 73% HBA and 27% HNA. LCP 4 is formed from 60% HBA, 4% HNA, 18% TA, and 18% BP. Compounding was performed using an 18-mm single screw extruder. Parts are injection molded the samples into plaques (60 mm×60 mm).

TABLE 1

|  | 1 | 2 | 3 | 4 | 5 |
|---|---|---|---|---|---|
| LCP 1 | — | 34.7 | 34.7 | 29.7 | 24.7 |
| LCP 2 | 31.5 | — | — | — | — |
| LCP 3 | 7.5 | — | — | 3.75 | 7.5 |
| LCP 4 | 16 | — | — | — | — |
| Glass Fibers | 20 | 10 | 5 | 10 | 10 |
| Alumina Trihydrate | 0.5 | 0.3 | 0.3 | 0.3 | 0.3 |
| Titanium Dioxide | 15 | 55 | 60 | 55 | 55 |
| Graphite | 2.5 | — | — | 1.25 | 2.5 |
| Copper Chromite | 4 | — | — | — | — |
| Black Pigment | 3 | — | — | — | — |

Samples 1-5 were tested for thermal and mechanical properties. The results are set forth below in Table 2.

TABLE 2

| Sample | 1 | 2 | 3 | 4 | 5 |
|---|---|---|---|---|---|
| Dielectric Constant (2 GHz) | 7.0 | 8.7 | 9.4 | 11.8 | 16.0 |
| Dissipation Factor (2 GHz) | 0.0088 | 0.0024 | 0.002 | 0.005 | 0.0126 |
| DTUL at 1.8 MPa (° C.) | 252 | 303 | 287 | 295 | 265 |
| Charpy Notched (kJ/m$^2$) | 18.4 | 5.8 | 4.7 | 5.4 | 5.2 |
| Charpy Unnotched (kJ/m$^2$) | 135 | 90 | 72 | 91 | 86 |
| Tensile Strength (MPa) | 13,472 | 13,804 | 12,879 | 14,077 | 14,878 |
| Tensile Modulus (MPa) | 1.4 | 0.7 | 0.6 | 0.7 | 0.63 |
| Tensile Elongation (%) | 179 | 150 | 141 | 133 | 129 |
| Flexural Strength (MPa) | 13,387 | 14,670 | 14,031 | 15,123 | 15,872 |
| Flexural Modulus (MPa) | 1.8 | 1.21 | 1.24 | 1.02 | 0.96 |
| Flexural Elongation (%) | 16.2 | 4.2 | 2.7 | 4.3 | 3.5 |
| Melt Viscosity (Pa-s) at 1,000 s$^{-1}$ | 41.3 | 37.6 | 36.4 | 39.2 | 47.1 |
| Melting Temperature (° C., 1$^{st}$ heat of DSC) | 304.73 | 338.75 | 336.6 | 338.2 | 338.73 |

Example 2

Samples 6-10 are formed from various combinations of liquid crystalline polymers (LCP 1, LCP 2, or LCP 3), titanium dioxide, graphite or carbon fibers, glass fibers, alumina trihydrate, and PPS. Compounding was performed using an 18-mm single screw extruder. Parts are injection molded the samples into plaques (60 mm×60 mm).

TABLE 3

|  | 6 | 7 | 8 | 9 | 10 |
|---|---|---|---|---|---|
| LCP 1 | 35 | — | — | — | — |
| LCP 2 | — | 34.5 | 24.5 | 29.5 | 39.5 |
| LCP 3 | — | — | 26.25 | 21 | — |
| Glass Fibers | — | — | 10 | 10 | 10 |
| Alumina Trihydrate | — | 0.5 | 0.5 | 0.5 | 0.5 |
| Titanium Dioxide | 65 | 65 | 30 | 30 | 30 |
| Graphite | — | — | 8.75 | — | — |
| Carbon Fibers | — | — | — | 9 | — |
| PPS | — | — | — | — | 20 |

Samples 6-10 were tested for thermal and mechanical properties. The results are set forth below in Table 4.

TABLE 4

| Sample | 6 | 7 | 8 | 9 | 10 |
|---|---|---|---|---|---|
| Dielectric Constant (2 GHz) | 9.7 | 10.1 | 4.9 | — | — |
| Dissipation Factor (2 GHz) | 0.0017 | 0.0032 | 0.3474 | — | — |
| DTUL at 1.8 MPa (° C.) | 229 | 214 | 247 | 247 | 256 |
| Charpy Notched (kJ/m$^2$) | 1.4 | 1.5 | 15 | 20 | 3 |
| Charpy Unnotched (kJ/m$^2$) | 229 | 214 | 247 | 247 | 256 |
| Tensile Strength (MPa) | 49 | 54 | 126 | 137 | 68 |
| Tensile Modulus (MPa) | 10,263 | 9,602 | 13,704 | 17,449 | 8,558 |
| Tensile Elongation (%) | 0.53 | 0.66 | 1.52 | 1.35 | 0.97 |
| Flexural Strength (MPa) | 111 | 108 | 171 | 192 | 99 |
| Flexural Modulus (MPa) | 11,628 | 10,389 | 14,128 | 17,271 | 8,781 |
| Flexural Elongation (%) | 1.23 | 1.45 | 2.04 | 1.67 | 1.34 |
| Melt Viscosity (Pa-s) at 1,000 s$^{-1}$ | 92.3 | 107.2 | 51.3 | 35.3 | 54.6 |
| Melting Temperature (° C., 1$^{st}$ heat of DSC) | 337.45 | 315.75 | 312.46 | 310.96 | 317.07 |

Example 3

Samples 11-15 are formed from various combinations of liquid crystalline polymers (LCP 2, LCP 3, or LCP 4), titanium dioxide, graphite, copper chromite filler (CuCr$_2$O$_4$), glass fibers, and alumina trihydrate. Compounding was performed using an 18-mm single screw extruder. Parts are injection molded the samples into plaques (60 mm×60 mm).

TABLE 5

|  | 11 | 12 | 13 | 14 | 15 |
|---|---|---|---|---|---|
| LCP 2 | 14.5 | 14.5 | 14.5 | 14.5 | 12.5 |
| LCP 3 | 3.75 | 5.25 | 7.5 | 9.75 | 11.25 |
| LCP 4 | 17.6 | 17.6 | 17.6 | 17.6 | 17.6 |
| Glass Fibers | 10 | 10 | 10 | 10 | 10 |
| Alumina Trihydrate | 0.5 | 0.5 | 0.5 | 0.5 | 0.5 |
| Titanium Dioxide | 48 | 46 | 43 | 40 | 40 |
| Graphite | 1.25 | 1.75 | 2.5 | 3.25 | 3.75 |
| Copper Chromite | 4.4 | 4.4 | 4.4 | 4.4 | 4.4 |

Samples 11-15 were tested for thermal and mechanical properties. The results are set forth below in Table 6.

TABLE 6

| Sample | 11 | 12 | 13 | 14 | 15 |
|---|---|---|---|---|---|
| Dielectric Constant (2 GHz) | 11.6 | 12.4 | 12.1 | 12.7 | 16.6 |
| Dissipation Factor (2 GHz) | 0.012 | 0.015 | 0.015 | 0.017 | 0.031 |
| DTUL at 1.8 MPa (° C.) | 221 | 223 | 228 | 229 | — |
| Charpy Notched (kJ/m$^2$) | 2.8 | 3.6 | 5.4 | 6.2 | 5 |
| Charpy Unnotched (kJ/m$^2$) | 5.2 | 5.5 | 7.2 | 8.2 | 6.3 |
| Tensile Strength (MPa) | 78 | 81 | 92 | 99 | 92 |
| Tensile Modulus (MPa) | 13,665 | 13,695 | 13,691 | 13,572 | 14,062 |
| Tensile Elongation (%) | 0.66 | 0.69 | 0.83 | 0.93 | 0.82 |
| Flexural Strength (MPa) | 116 | 126 | 132 | 144 | 134 |
| Flexural Modulus (MPa) | 14,692 | 14,723 | 14,547 | 14,567 | 15,037 |
| Flexural Elongation (%) | 0.96 | 1.08 | 1.16 | 1.33 | 1.19 |
| Melt Viscosity (Pa-s) at 1,000 s$^{-1}$ | 90 | 89 | 81 | 74 | 87 |
| Melting Temperature (° C., 1$^{st}$ heat of DSC) | 333 | 332 | 333 | 333 | 333 |

Example 4

Samples 16-22 are formed from various combinations of liquid crystalline polymers (LCP 2, LCP 3, or LCP 4), graphite, carbon fibers, copper chromite filler (CuCr$_2$O$_4$), and glass fibers. Compounding was performed using an 18-mm single screw extruder. Parts are injection molded the samples into plaques (60 mm×60 mm).

TABLE 7

| | 16 | 17 | 18 | 19 | 20 | 21 | 22 |
|---|---|---|---|---|---|---|---|
| LCP 2 | 8 | 18 | 28 | 38 | 33 | — | — |
| LCP 3 | 35 | 28 | 21 | 14 | 17.5 | 47.25 | 51 |
| LCP 4 | 17.6 | 17.6 | 17.6 | 17.6 | 17.6 | 17.6 | 17.6 |
| Glass Fibers | 20 | 20 | 20 | 20 | 20 | 15 | 10 |
| Graphite | — | — | — | — | — | 15.75 | 17 |
| Carbon Fibers | 15 | 12 | 9 | 6 | 7.5 | — | — |
| Copper Chromite | 4.4 | 4.4 | 4.4 | 4.4 | 4.4 | 4.4 | 4.4 |

Samples 16-22 were tested for thermal and mechanical properties. The results are set forth below in Table 8.

TABLE 8

| | Sample | | | | | | |
|---|---|---|---|---|---|---|---|
| | 16 | 17 | 18 | 19 | 20 | 21 | 22 |
| Dielectric Constant (2 GHz) | — | — | 22 | 38 | 26 | — | — |
| Dissipation Factor (2 GHz) | — | — | 0.045 | 0.09 | 0.06 | — | — |
| DTUL at 1.8 MPa (° C.) | 222 | 228 | 240 | 245 | 246 | 231 | 228 |
| Charpy Notched (kJ/m$^2$) | 29.9 | 33.6 | 37.4 | 44.6 | 34 | 29 | 30 |
| Charpy Unnotched (kJ/m$^2$) | 32.8 | 32.6 | 28.4 | 28.2 | 44 | 37 | 39 |
| Tensile Strength (MPa) | 157 | 170 | 172 | 170 | 175 | 127 | 125 |
| Tensile Modulus (MPa) | 21,731 | 20,982 | 19,385 | 17,536 | 18,682 | 12,981 | 11,610 |
| Tensile Elongation (%) | 1.49 | 1.67 | 1.65 | 1.72 | 1.66 | 2.02 | 2.87 |
| Flexural Strength (MPa) | 236 | 243 | 245 | 240 | 244 | 194 | 182 |
| Flexural Modulus (MPa) | 22,078 | 20584 | 18,897 | 16,749 | 18,167 | 13,749 | 12,642 |
| Flexural Elongation (%) | 1.93 | 2.14 | 2.39 | 2.69 | 2.5 | 2.86 | 3.33 |
| Melt Viscosity (Pa-s) at 1,000 s$^{-1}$ | 25.2 | 26.6 | 30.8 | 34 | 34.9 | 46.6 | 45.0 |

Example 5

Samples 23-27 are formed from various combinations of liquid crystalline polymers (LCP 2, LCP 3, or LCP 4), copper chromite (CuCr$_2$O$_4$), glass fibers, zinc oxide single-crystal, tetrapod whiskers (Pana-Tetra™ from Panasonic), conductive graphite, and/or semi-conductive graphite (Krefine™ from Kureha Extron, volume resistivity of 3×10$^7$ ohm-cm). Compounding was performed using an 18-mm single screw extruder. Parts are injection molded the samples into plaques (60 mm×60 mm).

TABLE 9

| | 23 | 24 | 25 | 26 | 27 |
|---|---|---|---|---|---|
| LCP 2 | 46 | 36 | 26 | 43 | 38 |
| LCP 3 | 5.25 | 5.25 | 5.25 | — | — |
| LCP 4 | 17.6 | 17.6 | 17.6 | 17.6 | 17.6 |
| Glass Fibers | 15 | 15 | 15 | 20 | 20 |
| Conductive Graphite | 1.75 | 1.75 | 1.75 | — | — |
| Semi-Conductive Graphite | — | — | — | 15 | 20 |
| ZnO Whiskers | 10 | 10 | 10 | — | — |
| Copper Chromite | 4.4 | 4.4 | 4.4 | 4.4 | 4.4 |

Samples 23-27 were tested for electrical, thermal, and mechanical properties. The results are set forth below in Table 10.

TABLE 10

| Sample | 23 | 24 | 25 | 26 | 27 |
|---|---|---|---|---|---|
| Dielectric Constant (2 GHz) | 8.36 | 12.13 | — | 4.13 | 11.85 |
| Dissipation Factor (2 GHz) | 0.09 | 0.24 | — | 0.0189 | 0.2077 |
| DTUL at 1.8 MPa (° C.) | 256 | 254 | 254 | 255 | 253 |
| Charpy Notched (kJ/m$^2$) | 29 | 16 | 8 | 7.2 | 5.2 |
| Charpy Unnotched (kJ/m$^2$) | 34 | 26 | 14 | 22.5 | 16.5 |
| Tensile Strength (MPa) | 154 | 145 | 124 | 124 | 107 |
| Tensile Modulus (MPa) | 12,080 | 12,879 | 13,767 | 12216 | 11623 |
| Tensile Elongation (%) | 2.19 | 1.68 | 1.14 | 1.65 | 1.31 |
| Flexural Strength (MPa) | 209 | 207 | 177 | 183 | 166 |

TABLE 10-continued

| Sample | 23 | 24 | 25 | 26 | 27 |
|---|---|---|---|---|---|
| Flexural Modulus (MPa) | 11,779 | 12,682 | 13,880 | 11647 | 11435 |
| Flexural Elongation (%) | 2.76 | 2.34 | 1.57 | 2.18 | 1.9 |
| Melt Viscosity (Pa-s) at 1,000 s$^{-1}$ | 46.7 | 59.2 | 72.7 | 141 | 146 |

Sample 27 was also subjected to a heat cycle test as described above. After testing, it was determined that the dielectric constant was 11.36 and the dissipation factor was 0.1566. Thus, the ratio of the dielectric constant after heat cycle testing to the initial dielectric constant was 0.96, and the ratio of the initial dissipation factor to the dissipation after heat cycle testing was 0.75.

Example 6

Samples 28-31 are formed from various combinations of liquid crystalline polymers (LCP 2, LCP 3, or LCP 4), alumina trihydrate (ATH), titanium dioxide, carbon fibers, copper chromite filler (CuCr$_2$O$_4$), and glass fibers. Compounding was performed using a 32-mm twin screw extruder. Parts are injection molded the samples into plaques (80 mm×90 mm×3 mm).

TABLE 11

|  | 28 | 29 | 30 | 31 |
|---|---|---|---|---|
| LCP 2 | 14.5 | 14.5 | 12.5 | 13.0 |
| LCP 3 | 4.9 | 7.0 | 7.0 | 7.0 |
| LCP 4 | 17.6 | 17.6 | 17.6 | 17.6 |
| ATH | 0.5 | 0.5 | 0.5 | — |
| Titanium Dioxide | 46 | 40 | 40 | 40 |
| Glass Fibers | 10 | 13 | 15 | 15 |
| Carbon Fibers | 2.1 | 3.0 | 3.0 | 3.0 |
| Copper Chromite | 4.4 | 4.4 | 4.4 | 4.4 |

Samples 28-31 were tested for thermal and mechanical properties. The results are set forth below in Table 12.

TABLE 12

| Sample | 28 | 29 | 30 | 31 |
|---|---|---|---|---|
| Dielectric Constant (2 GHz) | 19.84 | — | 22.36 | 21.59 |
| Dissipation Factor (2 GHz) | 0.0251 | — | 0.0326 | 0.0346 |
| DTUL at 1.8 MPa (° C.) | 228 | 233 | 232 | 229 |
| Charpy Notched (kJ/m$^2$) |  |  |  |  |
| Charpy Unnotched (kJ/m$^2$) |  |  |  |  |

TABLE 12-continued

| Sample | 28 | 29 | 30 | 31 |
|---|---|---|---|---|
| Tensile Strength (MPa) | 97 | 113 | 112 | 97 |
| Tensile Modulus (MPa) | 14674 | 15761 | 16113 | 15900 |
| Tensile Elongation (%) | 0.86 | 1 | 0.92 | 0.77 |
| Flexural Strength (MPa) | 143 | 162 | 159 | 143 |
| Flexural Modulus (MPa) | 14591 | 15345 | 16612 | 15978 |
| Flexural Elongation (%) | 1.25 | 1.41 | 1.22 | 1.08 |

Example 7

Samples 32-37 are formed from various combinations of liquid crystalline polymers (LCP 2, LCP 3, or LCP 4), alumina trihydrate (ATH), titanium dioxide, carbon fibers, copper chromite filler (CuCr$_2$O$_4$), and glass fibers. Compounding was performed using a 32-mm twin screw extruder. Parts are injection molded the samples into plaques (80 mm×90 mm×3 mm).

TABLE 13

|  | 32 | 33 | 34 | 35 | 36 | 37 |
|---|---|---|---|---|---|---|
| LCP 2 | 15.5 | 14.5 | 13.5 | 14.5 | 11.5 | 16.5 |
| LCP 3 | 8.4 | 9.1 | 9.8 | 5.6 | 6.2 | 6.2 |
| LCP 4 | 17.6 | 17.6 | 17.6 | 17.6 | 17.6 | 17.6 |
| ATH | 0.5 | 0.5 | 0.5 | 0.5 | 0.5 | 0.5 |
| Titanium Dioxide | 40 | 40 | 40 | 35 | 40 | 35 |
| Glass Fibers | 10 | 10 | 10 | 20 | 20 | 20 |
| Carbon Fibers | 3.6 | 3.9 | 4.2 | 2.4 | 1.8 | 1.8 |
| Copper Chromite | 4.4 | 4.4 | 4.4 | 4.4 | 4.4 | 4.4 |

Samples 32-37 were tested for thermal and mechanical properties. The results are set forth below in Table 14.

TABLE 14

| | Sample | | | | | |
|---|---|---|---|---|---|---|
|  | 32 | 33 | 34 | 35 | 36 | 37 |
| Dielectric Constant (2 GHz) | — | 32.71 | 35 | 15.2 | 14.9 | 13.0 |
| Dissipation Factor (2 GHz) | — | 0.0421 | 0.0652 | 0.0211 | 0.0171 | 0.0160 |
| DTUL at 1.8 MPa (° C.) | 231 | 229 | 229 | 244 | 239 | 245 |
| Charpy Notched (kJ/m$^2$) |  |  |  |  |  |  |
| Charpy Unnotched (kJ/m$^2$) |  |  |  |  |  |  |
| Tensile Strength (MPa) | 108 | 107 | 108 | 117 | 104 | 116 |
| Tensile Modulus (MPa) | 14809 | 15218 | 15286 | 17511 | 17829 | 16871 |
| Tensile Elongation (%) | 1.01 | 0.95 | 0.97 | 0.89 | 0.77 | 0.94 |
| Flexural Strength (MPa) | 162 | 164 | 164 | 174 | 157 | 174 |
| Flexural Modulus (MPa) | 15258 | 15833 | 16157 | 17236 | 17875 | 17056 |
| Flexural Elongation (%) | 1.45 | 1.41 | 1.38 | 1.28 | 1.05 | 1.31 |

Samples 35-37 were also subjected to a heat cycle test as described above. Upon testing, it was determined that the resulting dissipation factor for the samples was 0.01764, 0.0155, and 0.0142, respectively. Thus, the ratio of the dissipation factor after heat cycle testing to the initial dissipation factor for Samples 35, 36, and 37 was 0.84, 0.91, and 0.89, respectively.

Example 8

Samples 38-44 are formed from various combinations of liquid crystalline polymers (LCP 2 and LCP 4), copper chromite filler (CuCr$_2$O$_4$), glass fibers, alumina trihydrate ("ATH"), lubricant (polyethylene wax), and polytetrafluoroethylenes (PTFE 1 and PTFE 2). PTFE 1 is a powder of polytetrafluoroethylene particles having a D50 particle size of 4 μm, and PTFE 2 is a powder of polytetrafluoroethylene particles having a D50 particle size of 40 μm. Compounding was performed using an 18-mm single screw extruder. Parts are injection molded the samples into plaques (60 mm×60 mm).

TABLE 15

|  | 38 | 39 | 40 | 41 | 42 | 43 | 44 |
|---|---|---|---|---|---|---|---|
| LCP 2 | 77.6 | 78 | 80 | 73 | 68 | 73 | 68 |
| LCP 4 | 17.6 | — | — | — | — | — | — |
| Glass Fibers | 15 | 15 | 13 | 15 | 15 | 15 | 15 |
| Alumina Trihydrate | 0.2 | 0.2 | 0.2 | 0.2 | 0.2 | 0.2 | 0.2 |
| Lubricant | 0.2 | 0.2 | 0.2 | 0.2 | 0.2 | 0.2 | 0.2 |
| Copper Chromite | 4.4 | 6.6 | 6.6 | 6.6 | 6.6 | 6.6 | 6.6 |
| PTFE 1 | — | — | — | 5 | 10 | — | — |
| PTFE 2 | — | — | — | — | — | 5 | 10 |

Samples 38-44 were tested for thermal and mechanical properties. The results are set forth below in Table 16.

TABLE 16

|  | Sample | | | | | | |
|---|---|---|---|---|---|---|---|
|  | 38 | 39 | 40 | 41 | 42 | 43 | 44 |
| Dielectric Constant (2 GHz) | 3.73 | 3.69 | 3.64 | 3.66 | 3.6 | 3.7 | 3.6 |
| Dissipation Factor (2 GHz) | 0.0056 | 0.0036 | 0.0035 | 0.0042 | 0.0038 | 0.0036 | 0.004 |
| Dielectric Constant (10 GHz) | — | — | — | 3.74 | — | — | — |
| Dissipation Factor (10 GHz) | — | — | — | 0.0037 | — | — | — |
| DTUL at 1.8 MPa (° C.) | 239 | 282 | 278 | 258 | 277 | 277 | 270 |
| Charpy Notched (kJ/m$^2$) | 51 | 45 | 52 | 68 | 53 | 44 | 19 |
| Charpy Unnotched (kJ/m$^2$) | 58 | 57 | 60 | 80 | 77 | 55 | 36 |
| Tensile Strength (MPa) | 134 | 142 | 140 | 129 | 113 | 164 | 126 |
| Tensile Modulus (MPa) | 10,547 | 12,090 | 11,880 | 8,971 | 10,026 | 12,666 | 12,359 |
| Tensile Elongation (%) | 3.08 | 2.56 | 2.58 | 3.74 | 2.98 | 2.82 | 1.7 |
| Flexural Strength (MPa) | 158 | 189 | 189 | 140 | 143 | 191 | 174 |
| Flexural Modulus (MPa) | 9,834 | 10,601 | 10,510 | 8,725 | 9,921 | 11,314 | 11,061 |
| Flexural Elongation (%) | >3.5 | >3.5 | >3.5 | >3.5 | >3.5 | 3.24 | 3.33 |
| Melt Viscosity (Pa-s) at 1,000 s$^{-1}$ | 24 | 36 | 37 | 30 | 44 | 44 | 62 |
| Melting Temperature (° C., 1$^{st}$ heat of DSC) | 309.98 | 320.26 | 320.58 | 324.25 | 324.65 | 320.76 | 322.95 |

Example 9

Samples 45-47 are formed from various combinations of liquid crystalline polymers (LCP 2, LCP 3, or LCP 4), alumina trihydrate (ATH), titanium dioxide, carbon fibers, copper chromite filler (CuCr$_2$O$_4$), and glass fibers. Compounding was performed using a 32-mm twin screw extruder. Parts are injection molded the samples into plaques (80 mm×90 mm×3 mm).

TABLE 17

|  | 45 | 46 | 47 |
|---|---|---|---|
| LCP 2 | 19.5 | 24.5 | 17.5 |
| LCP 3 | 5.6 | 5.6 | 7.0 |
| LCP 4 | 17.6 | 17.6 | 17.6 |
| ATH | 0.5 | 0.5 | 0.5 |
| Titanium Dioxide | 30 | 25 | 30 |
| Glass Fibers | 20 | 20 | 20 |
| Carbon Fibers | 2.4 | 2.4 | 3.0 |
| Copper Chromite | 4.4 | 4.4 | 4.4 |

Samples 45-47 were tested for thermal and mechanical properties. The results are set forth below in Table 18.

TABLE 18

| Sample | 45 | 46 | 47 |
|---|---|---|---|
| Dielectric Constant (2 GHz) | 14.3 | 13.3 | 16.9 |
| Dissipation Factor (2 GHz) | 0.017 | 0.017 | 0.019 |
| Melt Viscosity (1,000 s$^{-1}$) | 50 | 39 | 49 |
| Melt Viscosity (400 s$^{-1}$) | 81 | 63 | 80 |
| DTUL at 1.8 MPa (° C.) | — | — | 243 |
| Charpy Notched (kJ/m$^2$) | 13 | 26 | 14 |
| Charpy Unnotched (kJ/m$^2$) | 17 | 26 | 14 |
| Tensile Strength (MPa) | 125 | 151 | 128 |
| Tensile Modulus (MPa) | 18,456 | 17,981 | 18,768 |
| Tensile Elongation (%) | 1.0 | 1.5 | 1.0 |
| Flexural Strength (MPa) | 174 | 195 | 181 |
| Flexural Modulus (MPa) | 16,437 | 15,385 | 17,288 |
| Flexural Elongation (%) | 1.36 | 1.79 | 1.36 |

Samples 45-47 were also subjected to a heat cycle test as described above. Upon testing, it was determined that the resulting dielectric constant for the samples was 14.1, 13.2, and 16.6, respectively. Thus, the ratio of the dielectric constant after heat cycle testing to the initial dielectric constant for Samples 45, 46, and 47 was 0.99, 0.99, and 0.98, respectively. It was also determined that the resulting dissipation factor for the samples was 0.020, 0.020, and 0.021, respectively. Thus, the ratio of the dissipation factor after heat cycle testing to the initial dissipation factor for Samples 45, 46, and 47 was 1.18, 1.18, and 1.10, respectively.

Example 10

Sample 48 is formed from various combinations of liquid crystalline polymers (LCP 2, LCP 3, and LCP 4), alumina trihydrate (ATH), titanium dioxide, carbon fibers, copper chromite filler (CuCr$_2$O$_4$), and glass fibers. Compounding was performed using a 32-mm twin screw extruder. Parts are injection molded the samples into plaques (80 mm×90 mm×3 mm).

TABLE 19

| | 48 |
|---|---|
| LCP 2 | 39.5 |
| LCP 3 | 7.0 |
| LCP 4 | 17.6 |
| ATH | 0.5 |
| Titanium Dioxide | 10 |
| Glass Fibers | 20 |
| Carbon Fibers | 3.0 |
| Copper Chromite | 4.4 |

Sample 48 was tested for thermal and mechanical properties. The results are set forth below in Table 20.

TABLE 20

| Sample | 48 |
|---|---|
| Dielectric Constant (2 GHz) | 9 |
| Dissipation Factor (2 GHz) | 0.013 |
| Melt Viscosity (1,000 s$^{-1}$) | 25.2 |
| Melt Viscosity (400 s$^{-1}$) | 38.7 |
| DTUL at 1.8 MPa (° C.) | 262 |
| Charpy Notched (kJ/m$^2$) | 33 |
| Charpy Unnotched (kJ/m$^2$) | 36 |
| Tensile Strength (MPa) | 162 |
| Tensile Modulus (MPa) | 17,232 |
| Tensile Elongation (%) | 1.78 |
| Flexural Strength (MPa) | 218 |
| Flexural Modulus (MPa) | 15,575 |
| Flexural Elongation (%) | 2.17 |

Example 11

Sample 49 is formed from liquid crystalline polymers (LCP 1 and LCP 4), hollow glass spheres, glass powder, glass fibers, and alumina trihydrate. The glass powder had a dielectric constant of 4.8 as determined at a frequency of 1 GHz. Compounding was performed using a 25-mm single screw extruder.

TABLE 21

| Sample | 49 |
|---|---|
| LCP 1 | 49.8 |
| LCP 4 | 15.4 |
| Hollow Glass Spheres | 17.0 |
| Glass Powder | 1.0 |
| Glass Fibers (4 mm length) | 10.0 |
| Alumina Trihydrate | 0.2 |
| Copper Chromite | 6.6 |

The samples were then tested for thermal and mechanical properties. The results are set forth below in Table 22.

| Sample | 49 |
|---|---|
| Dielectric Constant (2 GHz) | 3.07 |
| Dissipation Factor (2 GHz) | 0.0043 |
| Dielectric Constant (10 GHz) | 3.14 |
| Dissipation Factor (10 GHz) | 0.0035 |
| Melt Viscosity at 1,000 s$^{-1}$ (Pa-s) | 55.5 |
| Melt Viscosity at 400 s$^{-1}$ (Pa-s) | 88.9 |
| Melting Temperature (° C.) | 338.6 |
| DTUL at 1.8 MPa (° C.) | 217 |
| Tensile Strength (MPa) | 81 |
| Tensile Modulus (MPa) | 7,658 |
| Tensile Elongation (%) | 1.41 |
| Flexural Strength (MPa) | 116 |
| Flexural Modulus (MPa) | 7,241 |

-continued

| Sample | 49 |
|---|---|
| Flexural Elongation (%) | 1.91 |
| Charpy Notched Impact Strength (kJ/m$^2$) | 3.1 |
| Charpy Unnotched Impact Strength (kJ/m$^2$) | 7.3 |

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A 5G antenna system comprising:
a substrate;
at least one antenna element configured to transmit and receive 5G radio frequency signals, the at least one antenna element coupled to the substrate;
wherein the substrate comprises a polymer composition that comprises a polymer matrix containing at least one polymer having a glass transition temperature of about 30° C. or more and at least one laser activatable additive and further wherein the polymer composition exhibits a dissipation factor of about 0.1 or less, as determined at a frequency of 2 GHz.

2. The 5G antenna system of claim 1, wherein the at least one antenna element has a feature size that is less than about 1,500 micrometers.

3. The 5G antenna system of claim 1, wherein the 5G radio frequency signals have a frequency that is greater than about 28 GHz.

4. The 5G antenna system of claim 1, wherein the at least one antenna element comprises a plurality of antenna elements arranged in an antenna array.

5. The 5G antenna system of claim 4, wherein the plurality of antenna elements are spaced apart by a spacing distance that is less than about 1,500 micrometers.

6. The 5G antenna system of claim 4, wherein the plurality of antenna elements comprise at least 16 antenna elements.

7. The 5G antenna system of claim 6, wherein the plurality of antenna elements are arranged in a grid.

8. The 5G antenna system of claim 4, wherein the antenna array is configured for at least 8 transmission channels and at least 8 reception channels.

9. The 5G antenna system of claim 4, wherein the antenna array has an average antenna element concentration of greater than 1,000 antenna elements per square centimeter.

10. The 5G antenna system of claim 1, further comprising a base station, and wherein the base station comprises the at least one antenna element.

11. The 5G antenna system of claim 1, further comprising at least one of a user computing device or a repeater, and wherein the at least one of the user computing device or the repeater base station comprises the at least one antenna element.

12. The 5G antenna system of claim 1, wherein the polymer comprises a polyamide, a polyester, a polyarylene sulfide, a polyarylketone, or a mixture thereof.

13. The 5G antenna system of claim 12, wherein the polymer comprises a polyester comprising a thermotropic liquid crystalline polymer.

14. The 5G antenna system of claim 1, wherein the polymer composition further comprises a laser activatable additive.

15. The 5G antenna system of claim 14, wherein the laser activatable additive contains spinel crystals having the following general formula:

$AB_2O_4$ wherein,

A is a metal cation having a valance of 2; and

B is a metal cation having a valance of 3.

16. The 5G antenna system of claim 14, wherein the spinel crystals include $MgAl_2O_4$, $ZnAl_2O_4$, $FeAl_2O_4$, $CuFe_2O_4$, $CuCr_2O_4$, $MnFe_2O_4$, $NiFe_2O_4$, $TiFe_2O_4$, $FeCr_2O_4$, $MgCr_2O_4$, or a combination thereof.

17. The 5G antenna system of claim 1, wherein the polymer composition further comprises a fibrous filler.

18. The 5G antenna system of claim 17, wherein the fibrous filler includes glass fibers.

19. The 5G antenna system of claim 1, wherein the polymer composition further comprises a dielectric material.

20. The 5G antenna system of claim 19, wherein the dielectric material has a volume resistivity of from about 0.1 ohm-cm to about $1 \times 10^{12}$ ohm-cm.

21. The 5G antenna system of claim 20, wherein the dielectric material contains an inorganic oxide material.

22. The 5G antenna system of claim 21, wherein the inorganic oxide material includes titanium dioxide particles.

23. The 5G antenna system of claim 21, wherein the inorganic oxide material includes inorganic oxide whiskers.

24. The 5G antenna system of claim 23, wherein the whiskers are zinc oxide whiskers.

25. The 5G antenna system of claim 23, wherein the whiskers have a central body and a plurality of needle crystals extending radially therefrom.

26. The 5G antenna system of claim 20, wherein the dielectric material includes an inorganic oxide material having a volume resistivity of from 0.1 ohm-cm to about 500 ohm-cm.

27. The 5G antenna system of claim 20, wherein the dielectric material includes a carbon material having a volume resistivity of from about $1 \times 10^3$ to about $1 \times 10^{12}$ ohm-cm.

28. The 5G antenna system of claim 20, wherein the dielectric material includes an electrically conductive material having a volume resistivity of less than about 0.1 ohm-cm and an insulative material having a volume resistivity of greater than about $1 \times 10^{12}$ ohm-cm.

29. The 5G antenna system of claim 28, wherein the electrically conductive material includes a carbon material and the insulative material includes an inorganic oxide material.

30. The 5G antenna system of claim 1, wherein the polymer composition further comprises a laser activatable additive, a fibrous filler, and a dielectric material, wherein the ratio of the weight percentage of the fibrous filler to the combined weight percentage of dielectric material and laser activatable additive is from about 0.05 to about 1.

31. The 5G antenna system of claim 1, wherein the polymer composition comprises from about 15 wt. % to about 85 wt. % of thermotropic liquid crystalline polymers and from about 0.1 wt. % to about 30 wt. % of the laser activatable additive.

32. The 5G antenna system of claim 1, wherein the polymer composition comprises a hydrophobic material.

33. The 5G antenna system of claim 32, wherein the hydrophobic material includes a fluoropolymer.

34. The 5G antenna system of claim 1, wherein the polymer composition comprises a hollow filler.

35. The 5G antenna system of claim 1, wherein the polymer composition exhibits a dielectric constant of about 4 or more, as determined at a frequency of 2 GHz.

36. The 5G antenna system of claim 1, wherein the polymer composition has a melt viscosity of from about 5 to about 150 Pa-s, as determined at a shear rate of 1,000 seconds$^{-1}$ and a temperature of 350° C.

* * * * *